United States Patent
Seo et al.

(10) Patent No.: US 10,355,982 B2
(45) Date of Patent: Jul. 16, 2019

(54) NETWORK DEVICE AND TERMINAL FOR MULTI-PATH COMMUNICATION, OPERATION METHOD THEREOF, AND PROGRAM IMPLEMENTING OPERATION METHOD

(71) Applicant: KT Corporation, Seongnam-si (KR)

(72) Inventors: Sunghoon Seo, Seoul (KR); Junghun Ryu, Seoul (KR); Chang Yeol Oh, Goyang-si (KR); Jai-Sop Hyun, Seoul (KR); Jinho Kim, Gwangju-si (KR); Seonjeong Min, Gimhae-si (KR)

(73) Assignee: KT Corporation, Seongnam-si (KR)

( * ) Notice: Subject to any disclaimer, the term of this patent is extended or adjusted under 35 U.S.C. 154(b) by 199 days.

(21) Appl. No.: 15/322,407

(22) PCT Filed: Jun. 1, 2015

(86) PCT No.: PCT/KR2015/005484
§ 371 (c)(1),
(2) Date: Dec. 27, 2016

(87) PCT Pub. No.: WO2015/199340
PCT Pub. Date: Dec. 30, 2015

(65) Prior Publication Data
US 2017/0134261 A1   May 11, 2017

(30) Foreign Application Priority Data

Jun. 27, 2014 (KR) .................. 10-2014-0079669
Jan. 29, 2015 (KR) .................. 10-2015-0014615

(51) Int. Cl.
*H04L 12/707* (2013.01)
*H04L 12/66* (2006.01)
(Continued)

(52) U.S. Cl.
CPC .......... *H04L 45/24* (2013.01); *H04L 12/1403* (2013.01); *H04L 12/66* (2013.01);
(Continued)

(58) Field of Classification Search
CPC ....................................................... H04L 45/24
See application file for complete search history.

(56) References Cited

U.S. PATENT DOCUMENTS 8,265,078 B2    9/2012  Masputra et al.
2002/0178282 A1*  11/2002  Mysore .................. H04L 47/10
                                                        709/234
(Continued)

FOREIGN PATENT DOCUMENTS

KR         10-0560724 B1      3/2006
KR    10-2008-0107454 A      12/2008
(Continued)

OTHER PUBLICATIONS

Communication dated Jul. 6, 2017, from the European Patent Office in counterpart European Application No. 15812323.2.
(Continued)

*Primary Examiner* — Ayanah S George
(74) *Attorney, Agent, or Firm* — Sughrue Mion, PLLC

(57) ABSTRACT

An approach for multipath communication of a terminal via a gateway is provided. The approach includes storing a whitelist including applications corresponding to multipath communication applicable objects, and generating, when a first application included in the whitelist is executed, at least one path connected to the gateway using at least one of multiplex communication interfaces.

15 Claims, 20 Drawing Sheets

(51) Int. Cl.
    *H04L 12/14*     (2006.01)
    *H04L 12/741*     (2013.01)
    *H04L 29/08*     (2006.01)
    *H04M 15/00*     (2006.01)
    *H04L 29/06*     (2006.01)
    *H04W 84/12*     (2009.01)

(52) U.S. Cl.
    CPC ............ *H04L 45/54* (2013.01); *H04L 67/141*
    (2013.01); *H04L 67/28* (2013.01); *H04L 69/14*
    (2013.01); *H04L 69/16* (2013.01); *H04M*
    *15/88* (2013.01); *H04W 84/12* (2013.01)

(56) References Cited

U.S. PATENT DOCUMENTS

| | | | |
|---|---|---|---|
| 2005/0198369 A1* | 9/2005 | Armstrong | G06F 13/102 709/238 |
| 2010/0115582 A1* | 5/2010 | Sapp | H04L 41/0806 726/1 |
| 2010/0216434 A1* | 8/2010 | Marcellino | H04W 36/385 455/412.2 |
| 2013/0195004 A1* | 8/2013 | Hampel | H04L 69/16 370/315 |
| 2013/0232534 A1 | 9/2013 | Salkintzis et al. | |

FOREIGN PATENT DOCUMENTS

| KR | 10-2011-0018235 A | 2/2011 |
|---|---|---|
| KR | 10-2011-0044680 A | 4/2011 |
| KR | 10-2012-0050805 A | 5/2012 |
| KR | 10-2012-0056728 A | 6/2012 |
| KR | 10-2012-0064276 A | 6/2012 |
| KR | 10-2013-0006385 A | 1/2013 |
| KR | 10-2014-0006980 A | 1/2014 |
| KR | 10-2014-0052979 A | 5/2014 |

OTHER PUBLICATIONS

"Motivation for LTE-WiFi Aggregation", 3GPP Draft; RP-140739 LTE-WiFi AGGR Motivation, 3rd Generation Partnership Project (3GPP), Mobile Competence Centre; 650, Route des Lucioles; F-06921 Sophia-Antipolis Cedex ; France no. Sophia Antipolis, France Jun. 6, 2014 (Jun. 6, 2014), XPO50781732 (8 pages total).

Alan Ford et al., "TCP Extensions for Multipath Operation with Multiple Addresses", Internet Engineering Task Force (IETF), Request for Comments (RFC): 6824, Jan. 2013, pp. 1-64.

International Search Report of PCT/KR2015/005484 dated Aug. 21, 2015 [PCT/ISA210].

* cited by examiner

NETWORK DEVICE AND TERMINAL FOR MULTI-PATH COMMUNICATION, OPERATION METHOD THEREOF, AND PROGRAM IMPLEMENTING OPERATION METHOD

CROSS REFERENCE TO RELATED APPLICATIONS

This application is a National Stage of International Application No. PCT/KR2015/005484, filed Jun. 1, 2015, claiming priorities based on Korean Patent Application Nos. 10-2014-0079669, filed Jun. 27, 2014 and 10-2015-0014615, filed Jan. 29, 2015, the contents of all of which are incorporated herein by reference in their entirety.

TECHNICAL FIELD

Exemplary embodiments relate to multipath communication.

BACKGROUND ART

Aggregation transmission is a technology of transmitting data simultaneously in a single transmission using a plurality of wireless networks. In an aggregation transmission technology, a terminal can be connected to a plurality of access networks, and one or more services or applications can communicate by aggregating a plurality of networks as if they are one network. Accordingly, an aggregation transmission system may send and receive large amounts of data using a plurality of available network resources.

Multipath TCP (MPTCP) technology is an L4 technology for simultaneously using a plurality of IP interfaces. The MPTCP technology may connect a terminal having a plurality of physical interfaces to a plurality of access networks, and may create a session for each subflow to perform end-to-end communication.

Most servers do not yet support the multipath communication and, therefore, cannot transmit data simultaneously using a plurality of wireless networks. Accordingly, terminals having multiplex communication interfaces have difficulty performing multipath communication with all servers.

DISCLOSURE

Technical Problem

Exemplary embodiments provide a network device and a terminal for multipath communication, an operation method for multipath communication, and a program implementing the operation method.

Technical Solution

According to an exemplary embodiment, a multipath communication method of a terminal via a gateway includes: storing a whitelist including applications corresponding to multipath communication applicable objects, and generating, when a first application included in the whitelist is executed, at least one path connected to the gateway using at least one of multiplex communication interfaces.

The multipath communication method may further include determining, when the first application is executed, whether the first application is included in the whitelist or not based on an identifier of the first application.

The generating of the at least one path connected to the gateway may further includes generating subflows connected to the gateway via each of a plurality of networks, and delivering traffic of the first application using the subflows of the networks to which connections are maintained.

The storing of the whitelist may include receiving at least one application list from a network device, and storing the received application list in the whitelist.

The multipath communication method may further include configuring a routing table such that traffic generated from the applications included in the whitelist is relayed via the gateway.

The multipath communication method may further include sending, when a second application not included in the whitelist is executed, traffic of the second application via a path that does not include the gateway.

According to another exemplary embodiment, a multipath communication method of a gateway which communicates with a terminal, includes: generating a first session with the terminal via a first network to deliver traffic of the application that is executed on the terminal; generating a second session with the terminal via a second network to deliver the traffic of the application; and delivering the traffic of the application via the first and second sessions.

The delivering of the application traffic may include determining a type of the first network based on information about the first session, and throttling, when the first network is a predetermined preferred network, delivery of the traffic via the second session.

The predetermined preferred network may be a WiFi network.

The delivering of the application traffic may include monitoring a communication state of the first network, and unthrottling, when the first network provides quality below a reference level as a result of monitoring, the delivery of the traffic via the second session.

In the delivering of the application traffic, the delivery of traffic may be controlled via the first and second sessions based on a payment plan of the terminal.

According to a further exemplary embodiment, a method of operating a policy distribution device and a terminal for multipath communication includes: generating, by the policy distribution device, a proxy policy including proxy server connection information and whitelist information; distributing, by the policy distribution device, the proxy policy to the terminal; and transmitting, by the terminal, traffic of any application to a predetermined proxy server based on the proxy policy, wherein the whitelist information includes a list of applications that correspond to multipath communication applicable objects.

The transmitting to the predetermined proxy server may include: configuring, by the terminal, a routing table such that traffic of a first application included in the whitelist is relayed via the first proxy server, and applying the proxy policy; identifying the first application based on identification information of the executed application; and transmitting the traffic of the first application to the first proxy server by looking up a routing table associated with the first application.

In the transmitting to the first proxy server, the traffic of the first application may be sent via multiple paths that are connected to the first proxy server.

According to yet another exemplary embodiment, an operation method of a terminal for multipath communication includes: configuring a source address used to create a socket of an application as a first communication interface;

mapping information about a first socket created by the application using the first communication interface as a source address and information about a second socket created using at least one communication interface set in a routing table as a source address, and storing the mapping information in a mapping table; and sending/receiving traffic of the application via the at least one communication interface set in the routing table based on the mapping table.

The operation method may further include updating, when the communication interface used by the second socket as the source address is changed, the mapping table based on information about the changed interface.

The first communication interface may be an interface for connection with a mobile communication network.

According to yet another exemplary embodiment, an operation method of a terminal for multipath communication includes: monitoring generating of subflows for multipath communication; enabling a WiFi interface if the subflows are generated; and disabling the WiFi interface if the subflows are terminated.

The operation method may, when the WiFi interface is enabled or disabled based on the subflows, further include setting a flag to a first value, checking the flag when WiFi on/off events occur, changing the flag to a second value when the flag is the first value, and determining WiFi on/off events to be caused by a user when the flag is not the first value.

According to yet another exemplary embodiment, a terminal for multipath communication includes: a multipath management unit configured to manage multipath communication-related configurations and policy information; a user-kernel interface unit configured to determine a routing policy for each application based on the configurations and the policy information; and a multipath processor configured to send traffic of each application via at least one communication interface based on the routing policy.

The multipath management unit may manage a whitelist that includes applications corresponding to multipath communication applicable objects.

The user-kernel interface unit may determine whether a first application is included in the whitelist or not based on application identification information, and when the first application is included in the whitelist, may configure a routing table such that traffic of the first application is relayed via a gateway predetermined in the configurations and the policy information.

The multipath processor may create at least one path that is connected to the gateway via at least one communication interface, and may send the traffic of the first application to the gateway via the at least one path.

Advantageous Effects

According to an exemplary embodiment, by using a plurality of available wireless networks at the same time, data transmitted via each path can be aggregated and delivered as one piece of data, in which a large amount of data may be quickly sent and received using a plurality of available network resources.

According to an exemplary embodiment, the terminal may be connected to a plurality of access networks, and one or more services or applications may perform communication by aggregating a plurality of networks as if they are one network.

According to an exemplary embodiment, the terminal may be connected via multiple paths to general servers that do not support multiple paths.

MODE FOR INVENTION

Figure 1:
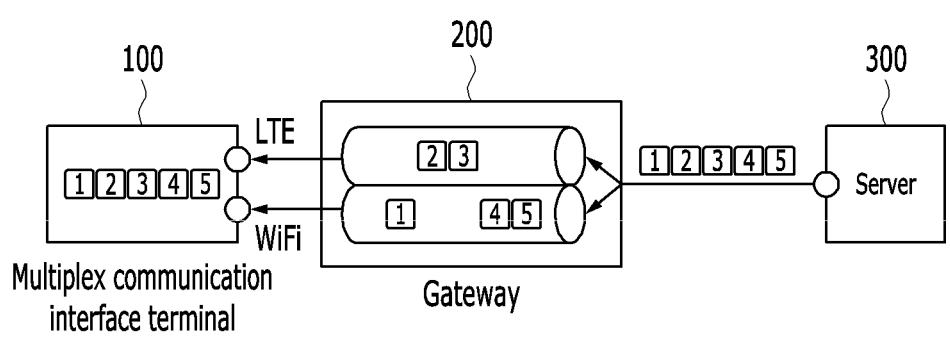
FIG. 1 is a conceptual diagram illustrating network aggregation transmission, according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or", and "module" described in the specification mean units for processing at least one function or operation and can be implemented by hardware components or software components and combinations thereof.

In some exemplary embodiments, a terminal can be referred to as a mobile station (MS), a mobile terminal (MT), a subscriber station (SS), a portable subscriber station (PSS), a user equipment (UE), or an access terminal (AT). The terminal may include all or some of functions of the MS, MT, SS, PSS, UE, or AT.

In some exemplary embodiments, the terminal can connect to a remote server by utilizing a network device such as a base station (BS), an access point (AP), a radio access station (RAS), a Node B, an evolved Node B (eNodeB), a base transceiver station (BTS), or a mobile multihop relay (MMR)-BS.

In some exemplary embodiments, the terminal can be a communication terminal, such as a mobile terminal (e.g. a smartphone), a tablet terminal (e.g. a tablet PC), a computer, or a television.

In some exemplary embodiments, the terminal can include a plurality of communication interfaces. For example, the communication interfaces may include wireless local area network interfaces such as WiFi/WLAN/Bluetooth and mobile communication network interfaces such as 3G/LTE (Long Term Evolution)/LTE-A (Long Term Evolution-Advanced) interfaces. Additionally, terminal manufacturers can utilize various communication interfaces. Exemplary embodiments may utilize communication interfaces such as a WiFi interface and an LTE interface; however, the communication interfaces are not limited thereto.

FIG. 1 is a conceptual diagram illustrating network aggregation transmission, according to an exemplary embodiment.

In network aggregation transmission, data is transmitted by aggregating a plurality of communication networks, in which data may be transmitted via one path using paths of a plurality of heterogeneous networks or a plurality of homogeneous networks. In network aggregation, data transmitted via a plurality of paths may be aggregated, in which the data is transmitted via one path. Network aggregation transmission may be referred to as multipath transmission because data is simultaneously transmitted via a plurality of paths.

In some exemplary embodiments, a terminal 100 includes multiplex communication interfaces. The terminal 100 may be connected, via the multiplex communication interfaces, to a plurality of networks (e.g., WiFi and LTE networks).

In some exemplary embodiments, a gateway 200 receives data transmitted by a server 300 to the terminal 100. The server 300 is assumed to not support multiplex communication interfaces. The gateway 200 may be a network device for multipath transmission.

In an exemplary embodiment, the gateway 200 splits the received data and transmits the data to the multiplex communication interfaces of the terminal 100. In another exemplary embodiment, the gateway 200 transmits a portion of the data to the terminal 100 via the LTE network and transmits the remaining data to the terminal 100 via the WiFi network. In an exemplary embodiment, the terminal 100 aggregates data that is received via the plurality of communication interfaces. In some exemplary embodiments, the gateway 200 aggregates data transmitted by the terminal 100 via the multiplex communication interfaces. The gateway 200 may transmit the data to the server 300.

Technologies of aggregating WiFi and LTE networks may be classified depending on the aggregation transmission layer.

In L2/link layer aggregation, a dedicated tunnel is generated by a WiFi AP at a boundary point (i.e., eNB) between an LTE core network and an access network.

In the L3/network layer aggregation, a virtual IP tunnel is generated to integrate IP addresses that are independently used in LTE and WiFi networks.

In L4/transport layer aggregation, after a session is generated via a single access network and an additional access network is available, the additional access network may join the data transmission regardless of its IP address system. A main communication peer at an application level may support a structure that enables data communication based on a single session using one or more access networks.

In L7/application layer aggregation, a dedicated application or agent may independently recombine data received via LTE and WiFi networks or may separate application protocol data so that the recombined data or the application protocol data may be transmitted.

Various kinds of aggregation transmission are possible depending on the aggregation transmission layers. Aggregation transmission via Multipath Transmission Control Protocol (MPTCP) will now be primarily described.

Figure 2:
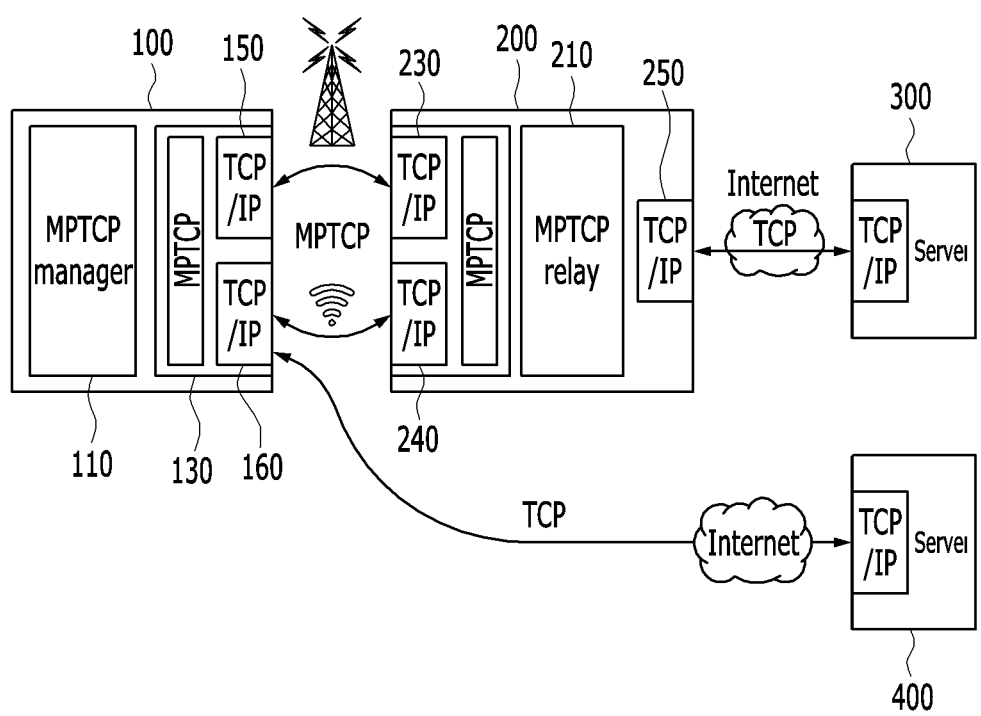
FIG. 2 is a schematic diagram illustrating a multipath transmission system, according to an exemplary embodiment.

FIG. 2 is a schematic diagram illustrating a multipath transmission system, according to an exemplary embodiment.

In some exemplary embodiments, the multipath transmission system includes the terminal 100 and the gateway 200 which is a network device. The terminal 100 and the gateway 200 transmit and receive data based on MPTCP. In an exemplary embodiment, the terminal 100 transmits data to the server 300, and receives data from the server 300, via the gateway 200. In another exemplary embodiment, the terminal 100 transmits data to the server 400 and receives data from the server 400 without utilizing the gateway 200. In some exemplary embodiments, the server 300 and the server 400 can be general servers capable of performing TCP-based communications via a single path.

In some exemplary embodiments, the terminal 100, supporting MPTCP, is installed with software including a MPTCP manager 110 and a MPTCP processor 130. The terminal 100 includes a plurality of physical communication interfaces. For example, the communication interface 150 may connect to the LTE network, and the communication interface 160 may connect to the WiFi network.

In some exemplary embodiments, the MPTCP manager 110 is an application to configure or manage MPTCP. A user can access the MPTCP manager 110 to configure or manage MPTCP. In another exemplary embodiment, the MPTCP manager 110 can manage various MPTCP-related configuration information or policy information that the terminal 100 can utilize. For example, the MPTCP manager 110 may be a GiGA path manager.

In some exemplary embodiments, the MPTCP processor 130 performs socket communication with applications on the terminal 100. The MPTCP processor 130 transmits data based on a routing table. In an exemplary embodiment, the MPTCP processor 130 transmits applications based on the transmission information for each application. For example, the MPTCP processor 130 can transmit a portion of the applications via MPTCP, and the MPTCP processor 130 can transmit another portion of the applications via general TCP.

In some exemplary embodiments, the gateway 200 relays MPTCP data and TCP data. The gateway 200 may be a Transparent CP supported proxy server that allows the terminal 100 to transmit and to receive data via MPTCP when communicating with a general TCP server. In an exemplary embodiment, the gateway 200 can be located where multiple networks are interconnected. In another exemplary embodiment, the gateway 200 can be located where the LTE network and the WiFi network are interconnected. The gateway 200 may be called a MultiNet Aggregation-Gateway (MA-GW).

In some exemplary embodiments, the gateway 200 includes a MPTCP relay 210, and a plurality of physical communication interfaces for transmitting and receiving data. For example, the communication interface 230 can transmit data to the LTE network and receive data from the LTE network. The communication interface 240 transmits data to the WiFi network and receives data from the WiFi network. The communication interface 250 transmits data to the server 300 and receives data from the server 300.

MPTCP is an L4 technology to simultaneously transmit and receive data using one or more IPs or communication interfaces. Accordingly, when the applications of the terminal 100 attempt to communicate via general TCP, the MPTCP processor 130 of the terminal 100 generates a session for each subflow and outputs data to at least one communication interface. Network aggregation transmission, such as MPTCP, can simultaneously use the LTE and WiFi networks by logically aggregating them as if they are one network. MPTCP can split a session for one service into a plurality of subflows such that access networks are dynamically added or deleted. Accordingly, MPTCP may increase transmission speed by aggregating two networks when aggregation transmission is possible. When a state of one of wireless networks is degraded, MPTCP may transmit traffic to the other wireless network providing a stable service even if physical environments vary.

Since MPTCP data and TCP data are relayed via the gateway 200 in the MPTCP system, the terminal 100 may be connected to the general server via MPTCP even when a general TCP server, not supporting MPTCP, is present.

Figure 3:
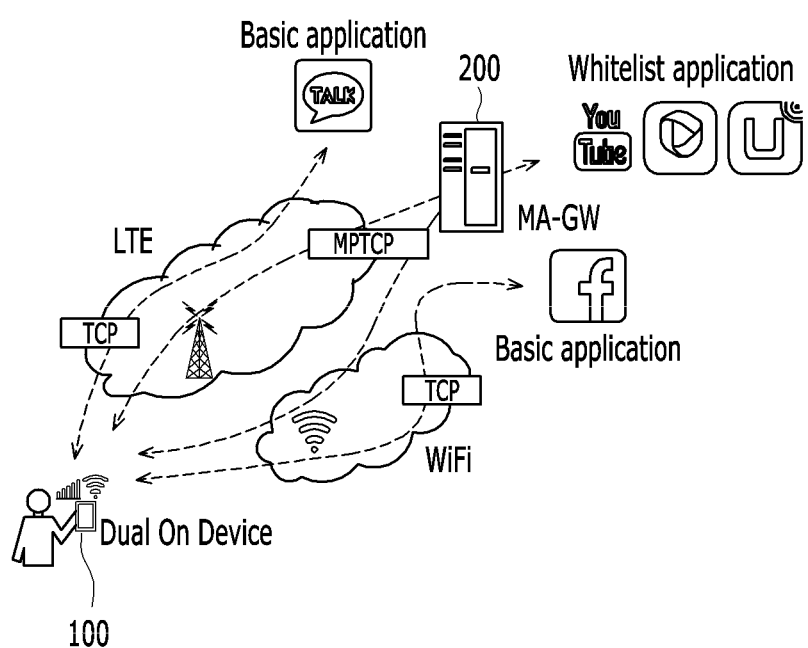
FIG. 3 is an example illustrating traffic flow, according to an exemplary embodiment.

FIG. 3 is an example illustrating traffic flow according to an exemplary embodiment. In some exemplary embodiments, the terminal 100 includes a plurality of communication interfaces (e.g., an interface connecting to an LTE network and an interface connecting to a WiFi network). The terminal 100 supports MPTCP via the communication interfaces.

In some exemplary embodiments, the terminal 100 selects a transmission path for each application based on the application's configuration. For example, the terminal 100 performs TCP-based communication, via the LTE network, with a server of a Basic Application (e.g., a messenger application). In another example, the terminal 100 performs TCP-based communication, via the WiFi network, with a server of another basic application (e.g., a social network service application). In an exemplary embodiment, the terminal 100 may configure both the LTE network and the WiFi network as simultaneously available transmission networks for some applications. For example, the terminal 100 can perform MPTCP-based communication, via the gateway 200 (MA-GW), with a server of a white list application (e.g., a video service application).

A list of the applications performing MPTCP-based communications via the gateway 200 may be called a multipath application list or whitelist (hereinafter "whitelist"). A user's selection or a policy of a network operator may configure the whitelist.

In some exemplary embodiments, the terminal 100 and the gateway 200 operate as a proxy client and a proxy server, respectively. The terminal 100 routes traffic, generated only from the applications of the whitelist, to the gateway 200 using a proxy technology, known and appreciated by those skilled in the art. The gateway 200 may dynamically manage a proxy policy that includes the whitelist. The gateway 200 may distribute the proxy policy to the terminal 100. In another exemplary embodiment, an additional policy distribution device (not shown) may generate and distribute the proxy policy.

Figure 4:
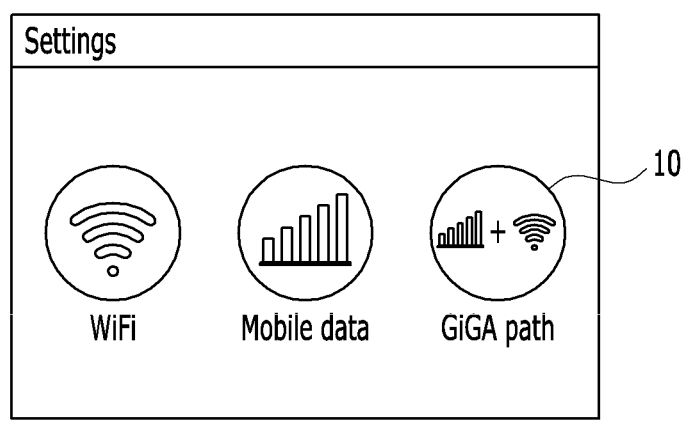
FIG. 4, FIG. 5 and FIG. 6 are examples illustrating a user configuration screen provided by a MPTCP manager, according to an exemplary embodiment.
Figure 5:
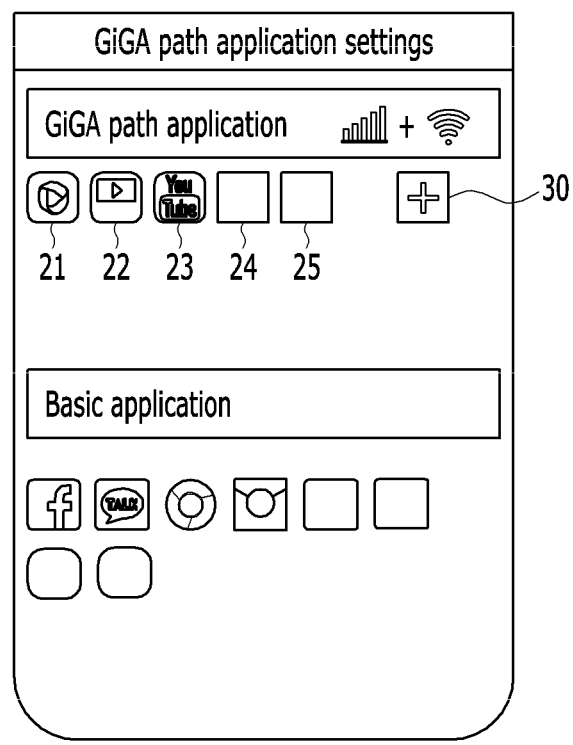
Figure 6:
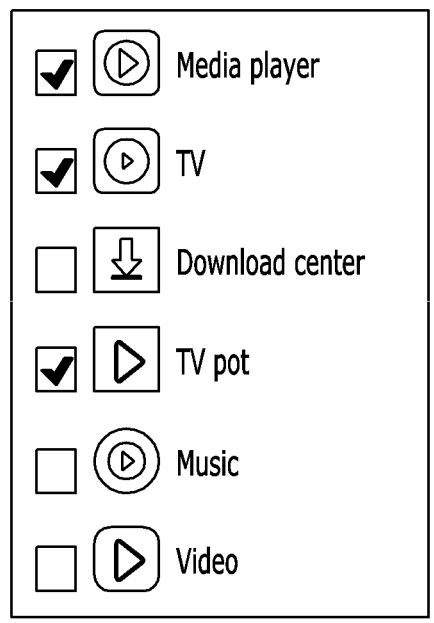

FIGS. 4 to 6 are examples illustrating a user configuration screen provided by the MPTCP manager 110, according to an exemplary embodiment. In some exemplary embodiments, an MPTCP manager installs the terminal 100. The MPTCP manager is an application accessible by the user, in which the user can configure communication environments and a communication path for each application. The MPTCP manager may also be a GiGA path manager.

Referring to FIG. 4, the MPTCP manager displays a screen on a display device which is executed on the terminal 100. The screen is accessible by the user to configure the communication environments. In some exemplary embodiments, the MPTCP manager displays images for allowing WiFi configurations (e.g. a WiFi image), mobile data configurations (e.g. a Mobile data image), and multipath configurations (e.g. a GiGA path image 10). In an exemplary embodiment, the MPTCP manager displays the GiGA path image 10, representing multipath configurations, on the screen of the terminal 100.

In some exemplary embodiments, when the GiGA path image 10 is selected, the MPTCP manager displays, as shown in FIG. 5, the screen for configuring multipath (GiGA path) applications. The MPTCP manager displays applications 21, 22, 23, 24, and 25 that allow multipath transmission. In an exemplary embodiment, the MPTCP manager displays an image 30 to add or delete applications that allow multipath transmission. In an exemplary embodiment, the MPTCP manager displays one or more basic applications. A basic application may be an application that communicates using either the LTE network and the WiFi network.

In an exemplary embodiment, when the user selects image 30, the MPTCP manager displays the applications included in the whitelist, as shown in FIG. 6. The user may select new applications to add to the whitelist. For instance, the user may select the media player to add to the whitelist. The user may de-select applications, included in the whitelist, to delete from the whitelist. For instance, the user may de-select the video to delete from the whitelist.

In some exemplary embodiments, the terminal 100 allows traffic of the application included in the whitelist to be relayed via the gateway 200 (as shown in FIG. 3). When a basic application, not included in the whitelist, is executed, the terminal 100 transmits and receives traffic via the LTE or WiFi networks depending on the application's configurations.

In an exemplary embodiment, the terminal 100 uses an application identifier (e.g., user identification (UID)) to identify whether the traffic belongs to a whitelist application or a basic application.

In some other embodiments, the whitelist may be configured by a policy of a network operator. The terminal 100 may receive a whitelist policy from a network device (e.g., the gateway 200). The terminal 100 may determine a transmission path for each application based on the received whitelist policy. In another embodiment, the terminal 100 receives the whitelist policy from a separate network server.

In an embodiment, the terminal 100 and the gateway 200 may be synchronized with the whitelist policy using push/pull methods or additional defined signaling.

Figure 7:
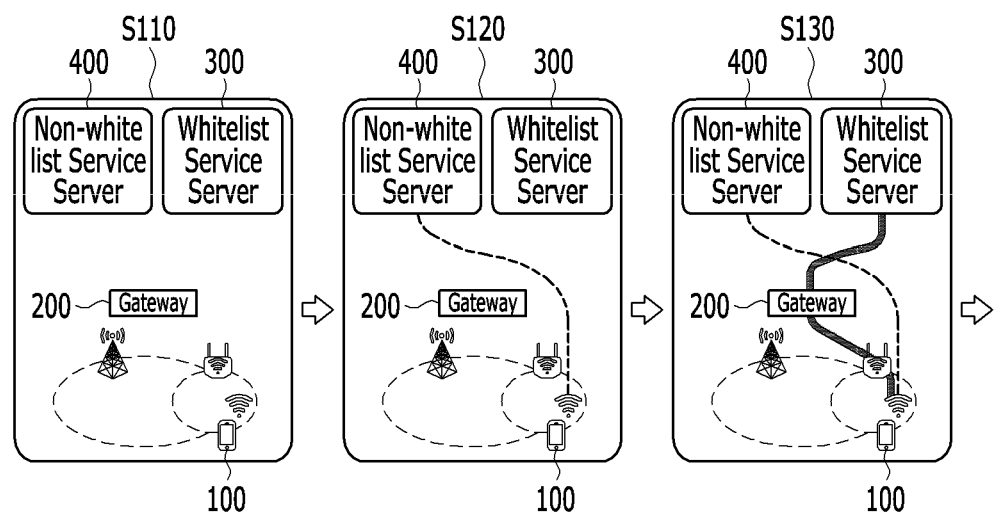
FIG. 7 is a flowchart that illustrates a multipath transmission method when a session is established via WiFi, according to an exemplary embodiment.
Figure 7:
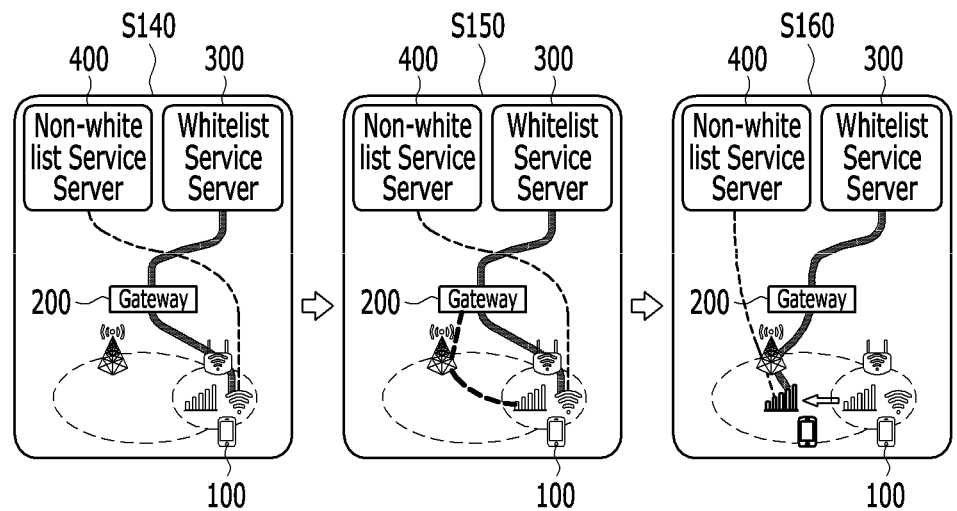

FIG. 7 is a flowchart that illustrates a multipath transmission method when a session is established via WiFi, according to an exemplary embodiment.

In some exemplary embodiments, a terminal 100 connects to a WiFi network (S110), in which a primary path is set to WiFi. A WiFi preferred state refers to a user initiating a session via WiFi.

The terminal 100 initiates a session and connects to the server 400 (i.e. non-whitelist service server) via the WiFi network when the terminal 100 executes a service or application not included in the whitelist (non-whitelist service) (S120). Traffic utilizing the non-whitelist service server 400 is not relayed via a gateway 200.

The terminal 100 initiates a session and connects with a server 300 (i.e. the whitelist service server) via a WiFi path when the terminal 100 executes a service/application included in the whitelist (whitelist service) (S130). The terminal 100 and the gateway 200 are connected, via the WiFi path, such that traffic, included in the whitelist, is relayed via the gateway 200.

In an exemplary embodiment, the terminal 100 enables an LTE interface for multipath transmission (S140). LTE/WiFi Dual On/Off may be configured in the terminal 100. The terminal 100 may simultaneously connect to the LTE network and the WiFi network when the LTE/WiFi Dual On is configured.

The terminal 100 adds an LTE path that is connected to the gateway 200 (S150). In an exemplary embodiment, the primary path is the WiFi path, and the secondary path is the added LTE path. In some exemplary embodiments, the terminal 100 and the gateway 200 maintain subflow sessions via the LTE path, but the whitelist traffic may be transmitted and received via the WiFi path. For instance, when the terminal 100 is in a WiFi preferred state (i.e. where the session is initiated via WiFi), even if the LTE path is added, the gateway 200 may be controlled to minimize use of LTE data.

In some exemplary embodiments, when the terminal has difficulty transmitting and receiving data via the WiFi path, the terminal 100 may set the LTE path to be the primary path (S160). For example, when the quality of the WiFi path deteriorates or the terminal 100 is out of a WiFi area, the LTE/WiFi Dual Off is configured in the terminal 100. The terminal 100 changes the LTE path configured as the secondary path to the primary path such that a seamless service is supported. In an exemplary embodiment, the terminal 100 disables the WiFi connection by deleting the WiFi path. The WiFi interface may be maintained in the enabled state.

When the terminal 100 is connected to the server 400 (i.e. non-whitelist service server) via the WiFi network and not being relayed via the gateway 200, the connected session needs to be disconnected and a new session needs to be connected via the LTE network when the terminal 100 is located out of the WiFi area. However, when the traffic is relayed via the gateway 200 and can be transmitted to the terminal 100 via the multipath (MPTCP), data may be seamlessly transmitted to the terminal 100, even if an access network of the terminal 100 is changed and any one path is deleted (e.g. when the terminal is located out of the WiFi area).

Figure 8:
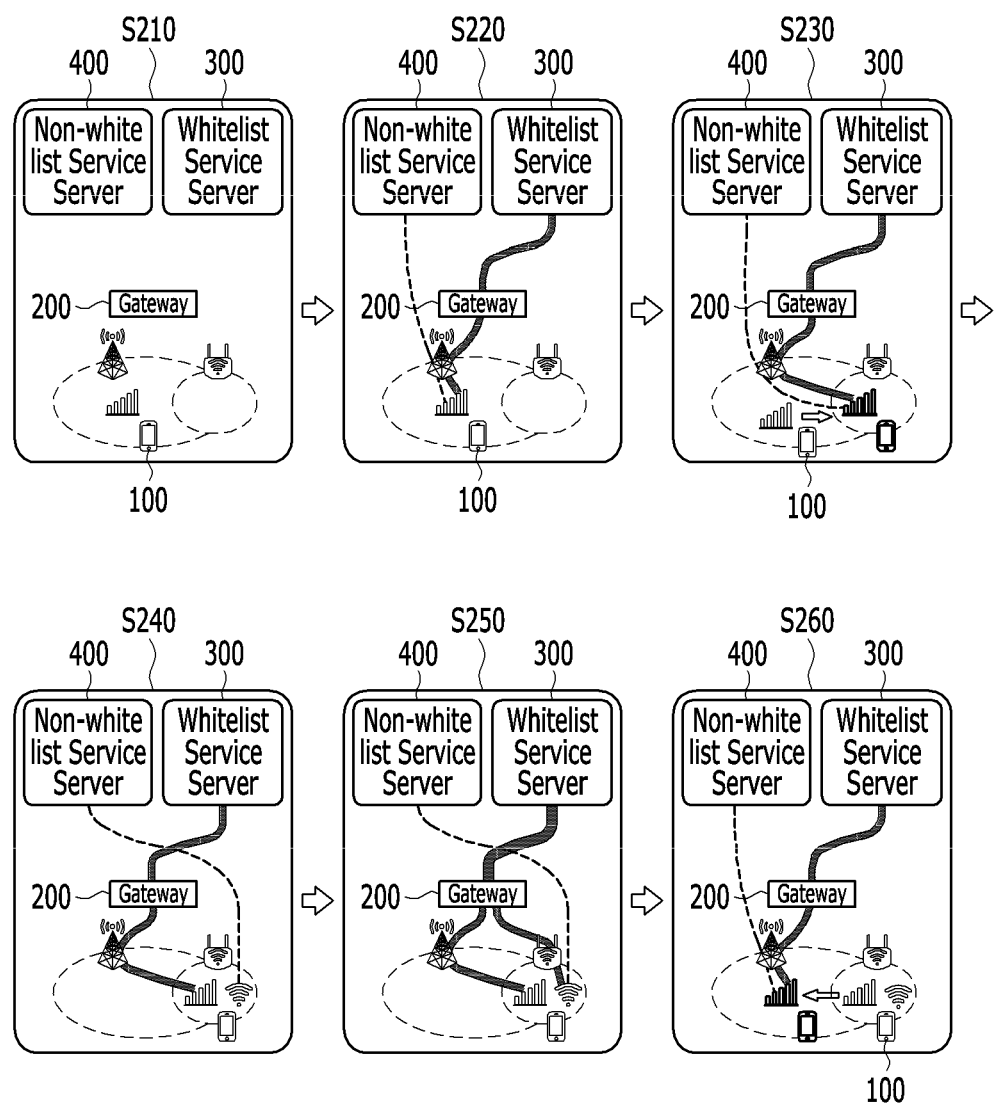
FIG. 8 is a flowchart illustrating a multipath transmission method when a session is initiated via LTE, according to an exemplary embodiment.

FIG. 8 is a flowchart illustrating a multipath transmission method when a session is initiated via LTE, according to an exemplary embodiment.

In some exemplary embodiments, a terminal 100 connects to an LTE network (S210), in which a primary path is set to LTE. A state in which a session is initiated via LTE may be referred to as an LTE-WiFi aggregation MPTCP state.

In an exemplary embodiment, when the terminal 100 executes a whitelist service or application, the terminal 100 initiates a session with a server 300 (i.e. a whitelist service server) via an LTE path that includes a gateway 200 (S220). The terminal 100 and the gateway 200 are connected via the LTE path. In another exemplary embodiment, when a non-whitelist service or application is executed, the terminal 100 and the server 400 are connected via the LTE network; however, traffic is not relayed via the gateway 200.

In an exemplary embodiment, when the terminal 100 moves to a WiFi area, the terminal 100 searches for accessible WiFi APs (S230). The terminal 100 checks quality of the WiFi Aps. The terminal 100 may attempt to connect to a WiFi network depending on the WiFi network settings. In an exemplary embodiment, the terminal 100 may automatically turn a WiFi communication module on and search its surroundings.

In some exemplary embodiments, the terminal 100 enables a WiFi interface for multipath transmission (S240). In an exemplary embodiment, when LTE/WiFi Dual On is set in the terminal 100, the terminal 100 may be simultaneously connected to the LTE network and the WiFi network. The WiFi path is set as a primary path, and the LTE path is set to a secondary path. In another exemplary embodiment, the LTE path may continue to be the primary path, and the WiFi path is set as the secondary path.

In some exemplary embodiments, the terminal 100 adds a WiFi path that is connected to the gateway 200 (S250). The terminal 100 performs aggregation transmission by aggregating the previously connected LTE path and the added WiFi path. The application, included in the whitelist, may transmit/receive data via each subflow of the LTE path and the WiFi path. In an exemplary embodiment, if there is a session that was previously connected via the LTE network and not via the gateway 200, this session is disconnected, and a new session is initiated via the WiFi path, in which the transition is not seamless. The non-whitelist service or application initiates a session in the WiFi network; however, traffic is not relayed via the gateway 200.

In some exemplary embodiments, the terminal 100 sets the LTE path as the primary path when it is difficult to transmit/receive data via the WiFi path (S260). For example, when quality of the WiFi path is degraded or the terminal 100 is located out of a WiFi area, the LTE/WiFi Dual Off is set in the terminal 100. The terminal 100 sets the LTE path configured as the secondary path to the primary path such that a seamless service is supported. In an exemplary embodiment, the terminal 100 disables WiFi connection by deleting the WiFi path; however, the WiFi interface may continue to be enabled. In an exemplary embodiment, the terminal 100 may automatically turn the WiFi communication module off.

Figure 9:
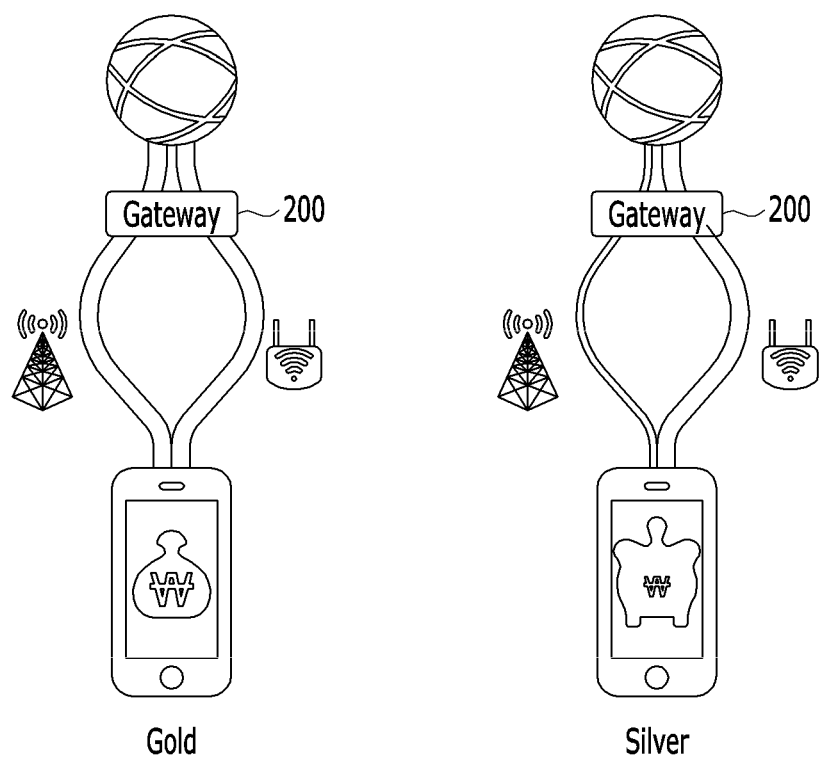
FIG. 9 is a conceptual diagram illustrating traffic controls for each terminal, according to an exemplary embodiment.

FIG. 9 is a conceptual diagram illustrating traffic controls for each terminal, according to an exemplary embodiment.

Aggregation transmission has advantages of increasing transmission speed and providing a seamless stable service. However, a user pays a bill according to an amount of data used. Consequently, when the aggregation transmission is always performed for a service or application included in a whitelist, the amount of data used may increase.

Accordingly, in some exemplary embodiments, a gateway 200 identifies a grade of a terminal based on a user's payment plan information or connection information. The gateway 200 controls the amount of data (i.e. LTE data) used that is associated with the bill. The grade may be subdivided into multiple grades, for example, a gold grade and a silver grade. When applying MPTCP to a gold grade terminal, the gateway 200 transmits traffic simultaneously using an LTE network and a WiFi network. When applying MPTCP to a silver grade terminal, the gateway 200 throttles traffic transmitted to the LTE network below a predetermined level (LTE throttling).

In an exemplary embodiment, the gateway 200 identifies the grade of the terminal 100 based on the payment plan information of the terminal 100. For example, when the terminal 100 corresponds to a subscriber using an unlimited LTE data plan, the gateway 200 determines the terminal 100 is a gold grade. When the terminal 100 corresponds to a subscriber having a limited amount of LTE data available, the gateway 200 determines that the terminal 100 is a silver grade. In another exemplary embodiment, when the subscriber has the limited amount of LTE data available, the gateway 200 can variably determine the grade of the terminal 100 based on the amount of remaining LTE data.

In an exemplary embodiment, the gateway 200 identifies the grade of the terminal 100 based on an initial access network of the terminal 100.

In some exemplary embodiments, when the terminal 100 executes an application in the LTE network (i.e. LTE-WiFi aggregation state), the gateway 200 determines that the terminal 100 is a gold grade and transmits traffic simultaneously using the LTE network and the WiFi network. The gateway 200 assumes that the user agrees to use the LTE data and provides a service for increasing a speed via LTE-WiFi aggregation if necessary. In an exemplary embodiment, the terminal 100 allows communication interfaces of both the LTE network and the WiFi network to be enabled (Dual on), and simultaneously uses the LTE network and the WiFi network. Accordingly, when a video or file transmission service is used in the LTE-WiFi aggregation state, image quality may be guaranteed and a file transmission speed may be increased.

In some exemplary embodiments, when the terminal 100 executes an application in the WiFi network (a WiFi preferred state), the gateway 200 determines that the terminal 100 is a silver grade. The gateway 200 decreases traffic transmitted to the LTE network below a predetermined level. Since the user intentionally connects to WiFi, the gateway 200 assumes that the user intends to use the least amount of LTE data as possible. In an exemplary embodiment, the terminal 100 may allow the communication interfaces of both the LTE network and the WiFi network to be enabled (Dual on) and TCP subflow sessions between the terminal 100 and the gateway 200 via the LTE network to be maintained, such that data is not sent/received via the LTE path nor traffic is sent/received below a predetermined level. Accordingly, the terminal 100 may process the maximum amount of traffic as possible in the WiFi network. In an exemplary embodiment, since the terminal 100 allows the LTE communication interface to be maintained in the enabled state, even when data is not transmitted via the LTE network using the subflow sessions, the terminal 100 may change the traffic path to the LTE network when WiFi quality deteriorates providing fully seamless mobility. Accordingly, when a video/file transmission service is used in the WiFi preferred state, seamless image playback and file transmission are possible.

In MPTCP, the gateway 200 may identify whether an IP address of the terminal belongs to the LTE network or the WiFi network (i.e., an access network) based on information about a TCP session established by the terminal 100 when an initial TCP SYN is received. In an exemplary embodiment, the gateway 200 may identify whether the terminal is a gold grade or a silver grade based on access network information.

When determining the IP address of the terminal is an IP of the LTE network, the gateway 200 determines that the terminal 100 is initially connected via the LTE network and sets the terminal 100 to a gold grade. When an IP address of the terminal is an IP of the WiFi network, the gateway 200 determines that the terminal 100 is initially connected to the WiFi network and sets the terminal 100 to a silver grade.

Figure 10:
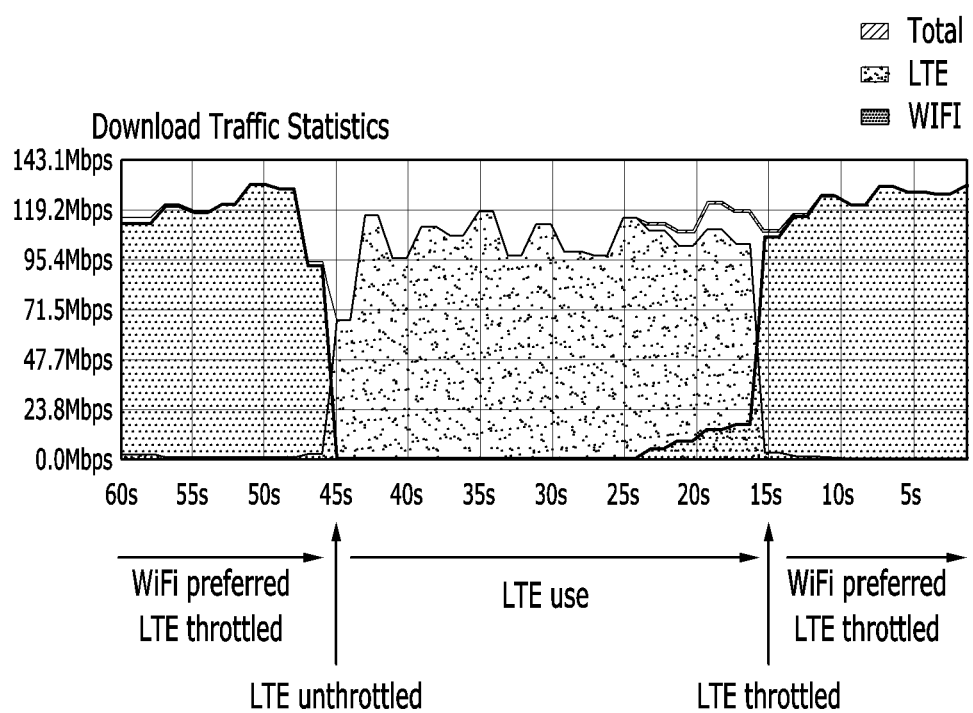
FIG. 10 is a graph illustrating traffic controls for each terminal, according to an exemplary embodiment.

In some exemplary embodiments, when the terminal 100 executes an application in the WiFi network (i.e. in the WiFi preferred state), the terminal 100 or the gateway 200 monitors a state of the WiFi path using a retransmission detection algorithm when transmitting data via the WiFi path, as shown in FIG. 10. In an exemplary embodiment, the gateway 200 can throttle or unthrottle traffic delivery via the LTE path based on the state of the WiFi path.

For example, in the WiFi preferred state, the gateway 200 throttles traffic delivery via the LTE path when the quality of the WiFi path is good (i.e. the data transmission speed is high). When quality of the WiFi path deteriorates, the gateway 200 temporarily unthrottles traffic delivery via the LTE path. When the quality of the WiFi path is recovered to a good state, the gateway 200 throttles traffic delivery via the LTE path.

Figure 11:
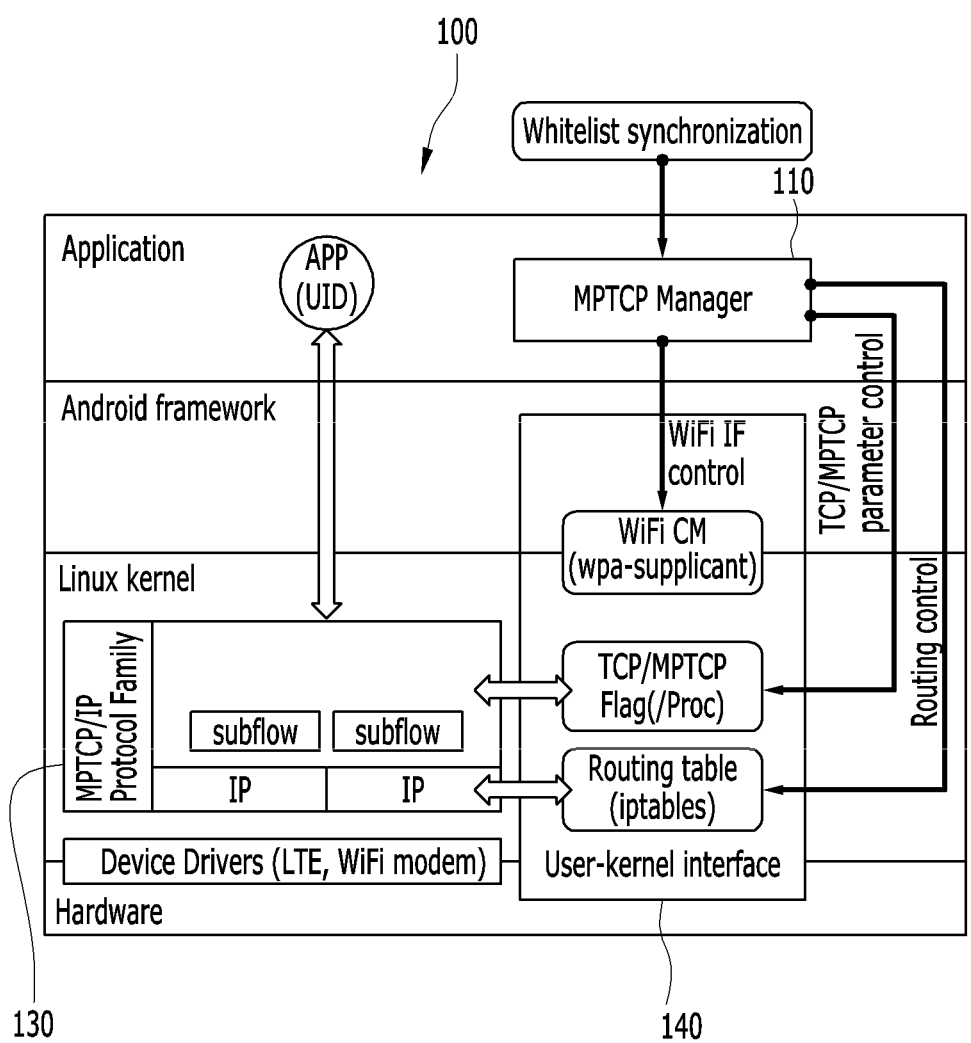
FIG. 11 is a schematic diagram of a terminal, according to an exemplary embodiment.

FIG. 11 is a schematic diagram of a terminal, according to an exemplary embodiment.

In some exemplary embodiments, a terminal 100 comprises a hardware including a plurality of communication modules, one or more applications, and an operating system stack between the hardware and the application.

The operating system stack serves as an interface between the hardware and the applications. The operating system stack controls the hardware to process the applications. The operating system stack can include a plurality of software stacks that are divided depending on their functions. For example, the terminal 100 may be installed with a Linux kernel and an Android framework, or any other software stacks that may be appreciated by one skilled in the art.

In an exemplary embodiment, the terminal 100, supporting MPTCP, is installed with a MPTCP manager 110, a MPTCP processor 130, and a user-kernel interface unit 140.

In some exemplary embodiments, the MPTCP manager 110 is an application installed at an application layer, and it may be referred to as a GiGA path manager. The MPTCP manager 110 may manage various MPTCP-related configuration information or policy information applicable to the terminal 100. The MPTCP manager 110 may provide a user interface (UI) that the user may access to configure or manage MPTCP.

In an exemplary embodiment, the MPTCP manager 110 may implement functions of controlling whether or not to use MPTCP, managing a whitelist, checking whether or not a specific AP is connected, selecting an AP supporting MPTCP, and controlling WiFi On/Off.

In an exemplary embodiment, the MPTCP manager 110 can determine whether or not to use MPTCP based on the user selection. The MPTCP manager 110 can determine whether or not to use MPTCP for each service/application. For instance, with reference to FIGS. 4-6, the user may use MPTCP by selecting the GiGA path image 10 displaying the multipath configurations. The user may also add or delete applications from the whitelist on the screen for configuring the multipath application. The MPTCP manager 110 may control LTE/WiFi Dual On/Off. The MPTCP usage control unit may control the LTE/WiFi Dual On/Off depending on a MPTCP mode (full mesh) and a TCP mode (default). For example, the MPTCP mode and the TCP mode may be configured as shown in Table 1 below.

TABLE 1

| | Support mode | |
|---|---|---|
| | MPTCP mode | TCP mode |
| Feature | multiple session (subflow) communication for each interface | single session (TCP) communication for each interface |
| Setting | LTE/WiFi Dual On (MPTCP enabled) If WiFi not connected, primary path = LTE If WiFi connected, primary path = WiFi/ secondary path = LTE | LTE/WiFi Dual off (MPTCP disabled) If WiFi not connected, connection path = LTE If WiFi connected, connection path = WiFi |

In some exemplary embodiments, the MPTCP manager 110 manages whitelist information (a list for MPTCP-applicable services/applications) using a whitelist management function. The MPTCP manager 110 can manage MPTCP-applicable services/applications based on a network operator policy by synchronizing the MPTCP policy, including the whitelist information, with the gateway 200 or a network operator policy server (not shown). The whitelist information, to be synchronized with the gateway 200, or the network operator policy server may have a HTTP-based XML or JSON format.

In some exemplary embodiments, the MPTCP manager 110 identifies whether or not a specific AP is connected based on identification information such as SSID/BSSID. The MPTCP manager 110 can select an AP that supports MPTCP. The MPTCP manager 110 can activate/deactivate a MPTCP function of a primary AP. The primary AP can be applied based on a network operator AP (e.g., Olleh WiFi), a personal/corporate AP (user preferred registration), a SSID, and a BSSID.

In some exemplary embodiments, the MPTCP manager 110 provides a primary use categorization function of the LTE network/WiFi network. For example, the primary use categorization function allows any application/group/category service to primarily use the LTE network, another application/group/category service to primarily use the WiFi network or to simultaneously use the LTE/WiFi networks (primary path determination).

In some exemplary embodiments, the MPTCP manager 110 provides a function of controlling WiFi On/Off. The WiFi On/Off may be controlled by determination of the user, determination of a connection manager, or automatic determination associated with whether or not to use WiFi in MPTCP.

In an exemplary embodiment, the MPTCP processor 130 performs a socket communication with the application. The MPTCP processor 130 transmits data based on a routing table. The MPTCP processor 130 may transmit some applications via MPTCP, and may transmit other applications via a general TCP. In an exemplary embodiment, the MPTCP processor 130 includes a MPTCP protocol family and is installed within an operating system, e.g., a Linux kernel. In another exemplary embodiment, the MPTCP processor 130 can be installed with a MPTCP/IP protocol family, which is a modified version of the TCP/IP protocol family. The MPTCP protocol family may be implemented in a Linux kernel by using a MPTCP open source for an Android platform.

In an exemplary embodiment, the MPTCP processor 130 provides a port for MPTCP support in the Linux kernel and maintains compatibility with the existing TCP. The MPTCP processor 130 may apply a MPTCP code to a Linux kernel version of the terminal, changing the kernel configuration such that it is installed with a congestion control algorithm, a TCP congestion control algorithm, and a MPTCP path manager algorithm which are specialized in MPTCP.

In some exemplary embodiments, the user-kernel interface unit 140 provides various kinds of interfaces (i.e. APIs) for control between the user and the kernel, such as system permission settings, command settings, etc. The user-kernel interface unit 140 provides an interface for obtaining, configuring, and changing information and parameters of various kinds of function modules implemented in a kernel region of the MPTCP manager 110. Information and parameters of the various kinds of function modules may be process execution information, routing information, kernel parameters, etc.

In an exemplary embodiment, the user-kernel interface unit 140 includes a WiFi connection manager (CM). The user-kernel interface unit 140 provides an interface that can control WiFi On/Off in the MPTCP manager 110 via the WiFi CM.

The user-kernel interface unit 140 may include a control interface of the MPTCP processor 130. The user-kernel interface unit 140 may specifically provide a function of controlling parameters of the MPTCP/IP protocol family. In an exemplary embodiment, the user-kernel interface unit 140 can change or add TCP system parameters (Tx/Rx memory allocation and the like) or MPTCP system parameters (MPTCP enabling/disabling, operation mode, syn_retry_limit, etc.). In another exemplary embodiment, the user-kernel interface unit 140 adds TCP/MPTCP parameter information and for example, adds destination address/port information of original data in a TCP option.

In an exemplary embodiment, the user-kernel interface unit 140 manages routing information. In the MPTCP manager 110, the user-kernel interface unit 140 provides an interface for controlling a routing path according to MPTCP/TCP. In an exemplary embodiment, the user-kernel interface unit 140 provides a function of determining whether or not to use a proxy server for each application, a function of managing the routing table (paths, rules, etc.), and a function of controlling parameters of the MPTCP/IP protocol family. In another exemplary embodiment, the user-kernel interface unit 140 determines whether or not to use a proxy server based on application identification information (e.g., UID) for each application. The user-kernel interface unit 140 determines that the applications included in the whitelist are relayed via the proxy server. The user-kernel interface unit 140 transmits data by looking up the routing table.

The user-kernel interface unit 140 classifies the applications included in the whitelist and provides a function of setting exception handling. The user-kernel interface unit 140 generally routes using a combination of an UID (Android App ID), a process ID (PID), and the like. The user-kernel interface unit 140 routes traffic generated by the applications included in the whitelist to the gateway 200. The user-kernel interface unit 140 may manage (add/modify/delete paths and rules) a conditional routing table for each service scenario.

Figure 12:
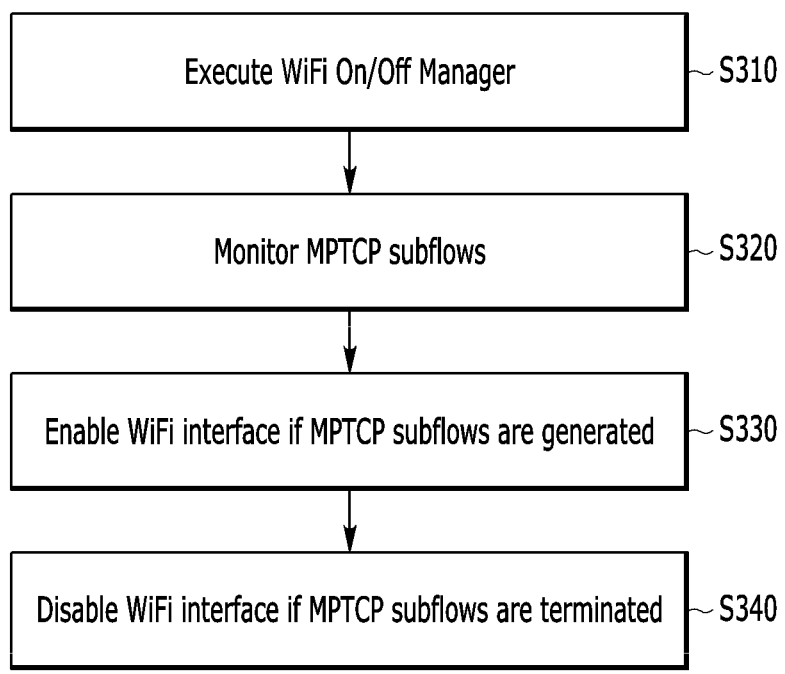
FIG. 12 and FIG. 13 are flowcharts illustrating operational steps of a WiFi control method of a multipath transmission terminal, according to an exemplary embodiment.
Figure 13:
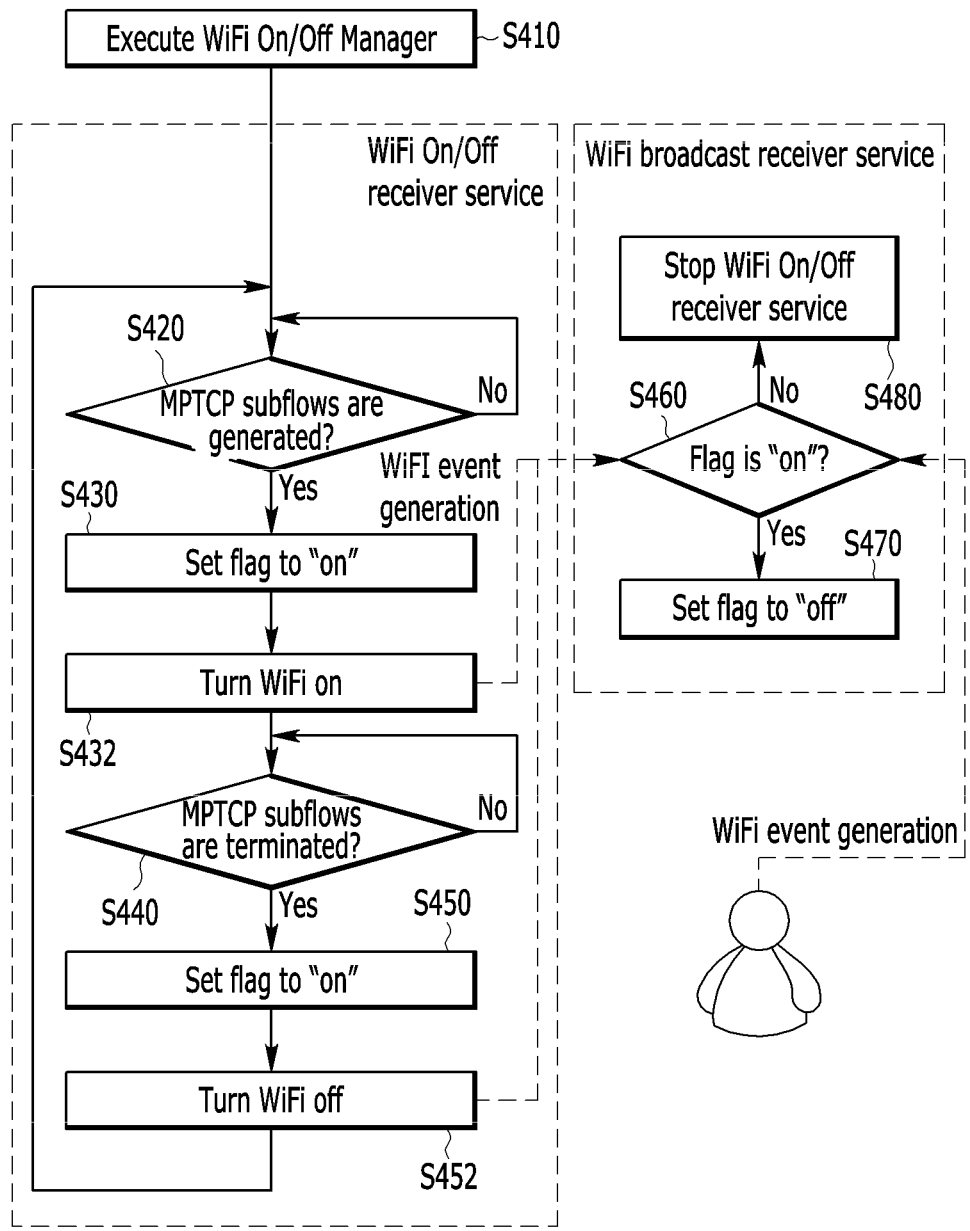

FIGS. 12 and 13 are flowcharts illustrating operational steps of a WiFi control method of a multipath transmission terminal, according to an exemplary embodiment.

Referring to FIG. 12, a terminal 100 supporting MPTCP performs multipath transmission using a plurality of communication interfaces. When the terminal 100 is set to a MPTCP mode, a WiFi interface is always enabled even when traffic is not generated. As a result, the constantly enabled WiFi interface reduces the battery life of the terminal 100.

To preserve battery life, the terminal 100 is installed with a WiFi On/Off manager. In some exemplary embodiments, the WiFi On/Off manager monitors MPTCP traffic, enables WiFi when MPTCP traffic exists, and disables WiFi when MPTCP traffic does not exist. In an exemplary embodiment, the WiFi On/Off manager controls WiFi when the terminal, to which MPTCP is applied, requires WiFi control (WiFi auto On/Off control), thereby reducing battery usage. In an exemplary embodiment, the WiFi On/Off manager monitors the MPTCP traffic. In an exemplary embodiment, the WiFi On/Off manager is installed in a region for controlling a WiFi module. For example, the WiFi On/Off manager may be installed in the MPTCP manager 110 or user-kernel interface unit 140. The WiFi On/Off manager may be separately installed in some regions of the Android framework/Linux kernel. Additionally, the WiFi On/Off manager may be developed as an application.

The WiFi On/Off manager is executed (S310). In an exemplary embodiment, the WiFi On/Off manager is executed when a connection path is LTE.

The WiFi On/Off manager monitors MPTCP subflows (S320). The WiFi On/Off manager may execute, in the background of the terminal, a thread periodically checking the MPTCP subflows and a thread receiving events regarding the WiFi interface.

The WiFi On/Off manager enables the WiFi interface if the MPTCP subflows are generated (S330). In an exemplary embodiment, the subflows are generated when applications included in a whitelist are executed on the terminal 100.

When the MPTCP subflows are terminated, the WiFi On/Off manager disables the WiFi interface (S340). In an exemplary embodiment, when the applications included in the whitelist stops running on the terminal 100, the subflows are terminated.

In an exemplary embodiment, a program executing the WiFi On/Off manager may be terminated. When the WiFi On/Off manager is terminated, the WiFi auto On/Off control stops. In another exemplary embodiment, while the WiFi On/Off manager is running, the WiFi On/Off manager stops controlling WiFi auto On/Off if a user enables or disables WiFi.

Referring to FIG. 13, the WiFi On/Off manager is executed (S410). In some exemplary embodiments, when the WiFi On/Off manager is executed, a WiFi On/Off receiver service is executed. In another exemplary embodiment, when a WiFi event occurs, a WiFi broadcast receiver service is executed. The WiFi On/Off receiver service is a thread that executes WiFi On/Off. The WiFi broadcast receiver service is a thread that manages WiFi events (WiFi broadcast receiver). In an exemplary embodiment, the WiFi broadcast receiver service receives WiFi event generation information from the user as well as the WiFi On/Off receiver service. The WiFi On/Off receiver service and the WiFi broadcast receiver service run in the background of the terminal 100.

The WiFi On/Off receiver service monitors whether MPTCP subflows are generated (S420). The WiFi On/Off receiver service may periodically check whether the MPTCP subflows are generated.

When the MPTCP subflows are generated (S420 "Yes" Branch), the WiFi On/Off receiver service sets a flag to "On" (WiFi_MANAGER_FLAG=on) (S430). By default, the flag is set to "off" (WiFi_MANAGER_FLAG=off). In an exemplary embodiment, the flag (WiFi_MANAGER_FLAG) indicates events enabling or disabling the WiFi interface.

The WiFi On/Off receiver service turns WiFi on (S432). The WiFi On/Off receiver service notifies the WiFi broadcast receiver service that an event occurred in WiFi. The flag set to "on" is delivered to the WiFi broadcast receiver service.

The WiFi On/Off receiver service monitors whether the MPTCP subflows are terminated (S440). In an exemplary embodiment, the WiFi On/Off receiver service may periodically check whether the MPTCP subflows are terminated.

When the MPTCP subflows are terminated (S440 "No" Branch), the WiFi On/Off receiver service sets the flag to "on" (WiFi_MANAGER_FLAG=on) (S450).

The WiFi On/Off receiver service turns WiFi off (S452). In an exemplary embodiment, the WiFi On/Off receiver service notifies the WiFi broadcast receiver service that an event occurred in WiFi. The flag set to "on" is delivered to the WiFi broadcast receiver service.

When the event occurs in WiFi, the WiFi broadcast receiver service operates. The WiFi broadcast receiver service determines, based on the flag (WiFi_MANAGER_FLAG), whether the event is generated by the WiFi On/Off receiver service or the user (S460).

If the flag is set to "on" (WiFi_MANAGER_FLAG=on) (S460 "Yes" branch), the WiFi broadcast receiver service initializes the flag (WiFi_MANAGER_FLAG=off) (S470). The WiFi broadcast receiver service determines that the WiFi event is generated by the WiFi On/Off manager which is an application and sets the flag to "off".

If the flag is set to "off" (WiFi_MANAGER_FLAG=off) (S460 "No" branch), the WiFi broadcast receiver service stops the WiFi On/Off receiver service (S480). The WiFi broadcast receiver service determines that the WiFi event is generated by the user. In this case, since WiFi is turned off by the user, WiFi on/off is controlled regardless of the creation of the MPTCP subflows, and the WiFi automatic on/off function is stopped.

In some exemplary embodiments, the WiFi On/Off manager is installed on the terminal 100 to enable and disable the WiFi interface when the MPTCP subflows are created and terminated, thereby improving the battery life of the terminal.

Figure 14:
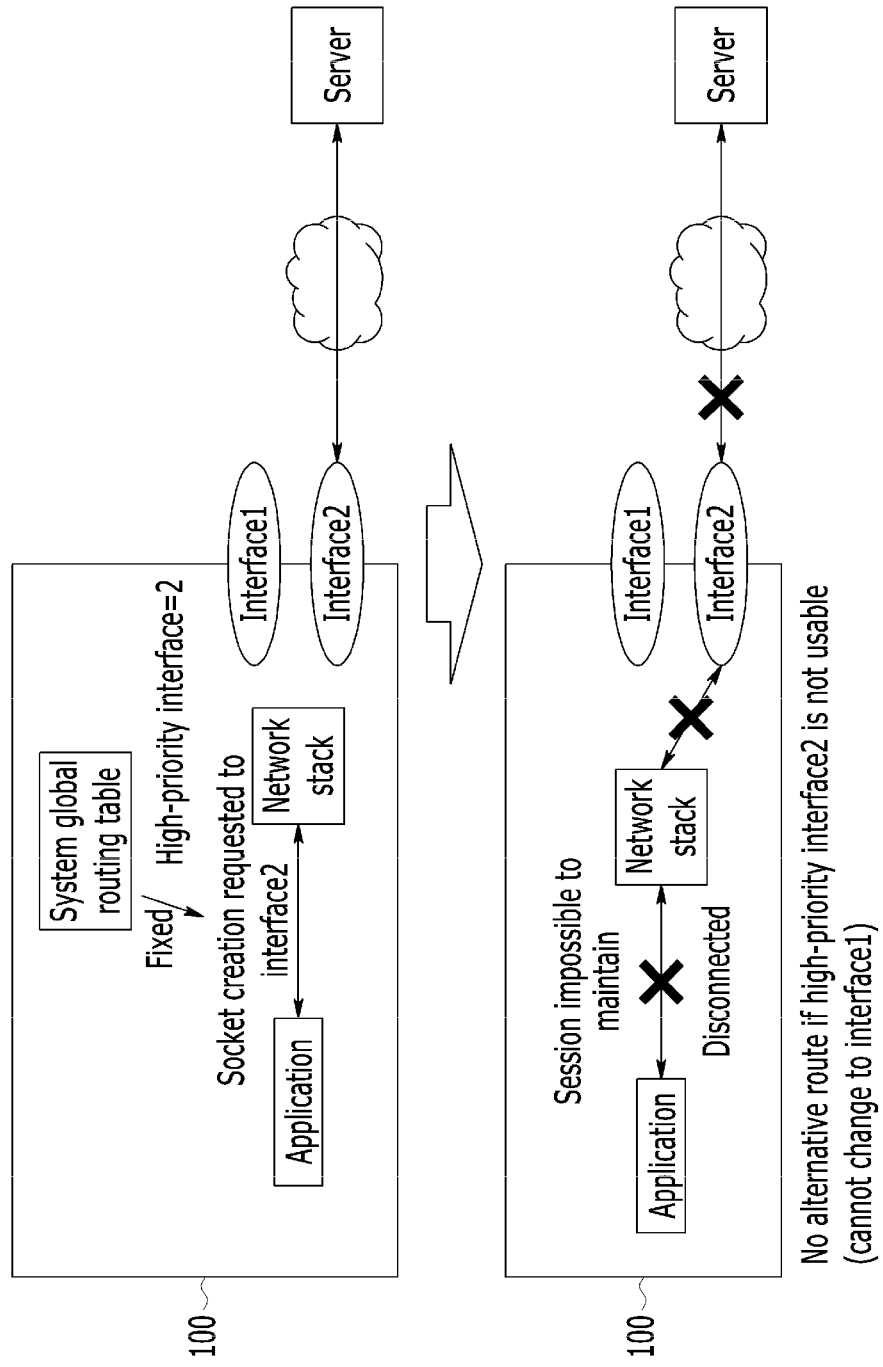
FIG. 14 is an example illustrating a conventional socket communication method.

FIG. 14 is an example illustrating a conventional socket communication method.

Techniques such as tunneling via virtual address, mobile IP, and handover seamlessly provide socket communication in a terminal supporting multiplex communication interfaces (WiFi). However, in a conventional socket communication method, because the terminal's resources are limited (i.e. the battery power allocated to network interfaces is limited), the existing mobile terminal is configured such that a communication connection can be made by only one interface at any one time. Manufacturers or operating system providers of the terminal can configure the priority of a communication interface (e.g., a WiFi interface as a primary connection network) and can implement a handover technology between other networks if connection to a WiFi network is not possible.

In response to an application being executed on the terminal, the application generates a socket with a network stack and transmits and receives traffic via the socket. The network stack and the communication interface2 are connected to deliver the traffic. The application and the network stack generate the socket via a predetermined communication interface2 (e.g., WiFi).

If the communication interface2 is fixed as a higher interface (higher interface=2) in a system global routing table, the application uses the socket that is created based on WiFi (i.e., a communication interface with a higher priority). Accordingly, if the terminal moves to a location in which the connection to WiFi via the communication interface2 deteriorates, a session created via the communication interface2 is no longer usable, and the application temporarily ends. When the corresponding communication interface cannot be used, the socket created by one communication interface cannot be seamlessly changed to another communication interface.

In a conventional socket communication method, when an application requests a communication socket, the socket is bound based on an interface with a higher routing priority globally in the system. The communication socket, which the application requests to connect, is determined by the system global routing table. When communication is no longer possible due to deterioration in some of an end-to-end communication section (e.g., WiFi communication failure), the corresponding socket communication is dropped generating a notification at the system level. The application, currently running, notifies the user of the communication drop message or abnormal termination. At which point, the application service is no longer available. Typically, a normal Unix/Linux-based communication structure has such a problem.

Figure 15:
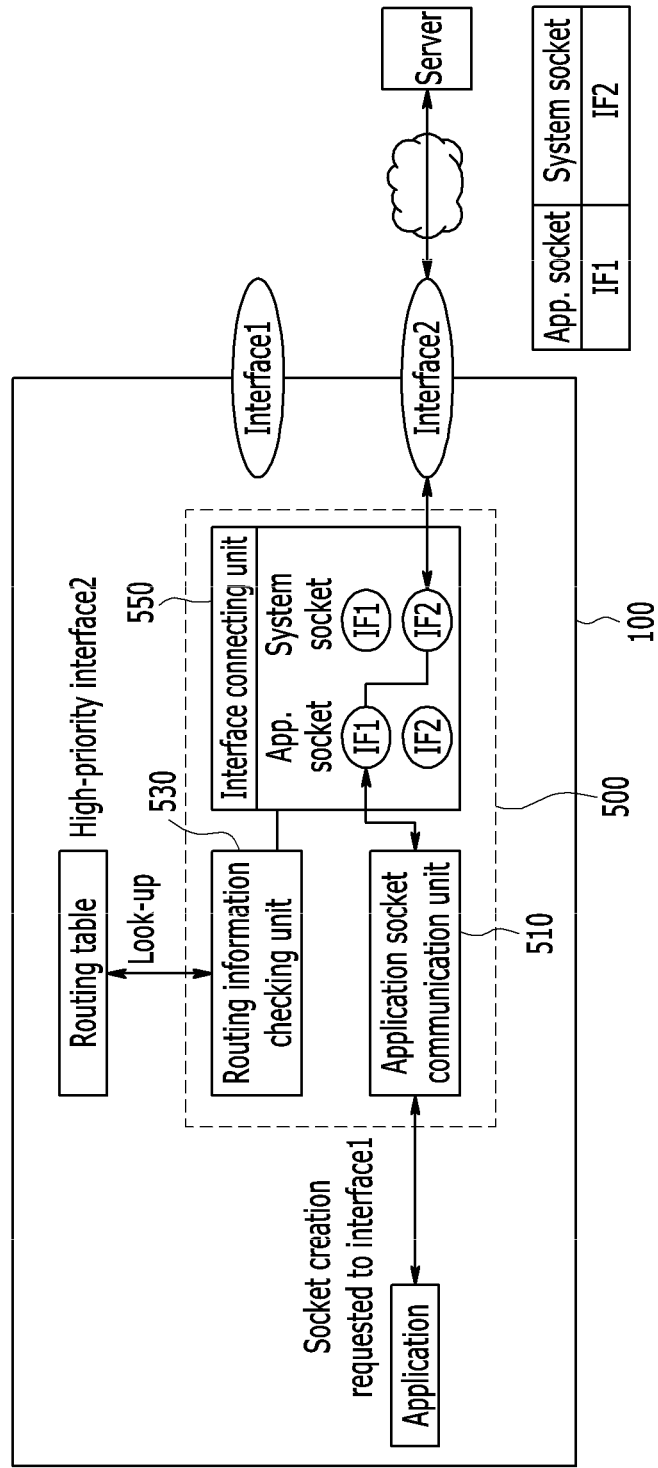
FIG. 15, FIG. 16 and FIG. 17 are functional block diagrams illustrating operational steps of a socket communication method, according to an exemplary embodiment.
Figure 16:
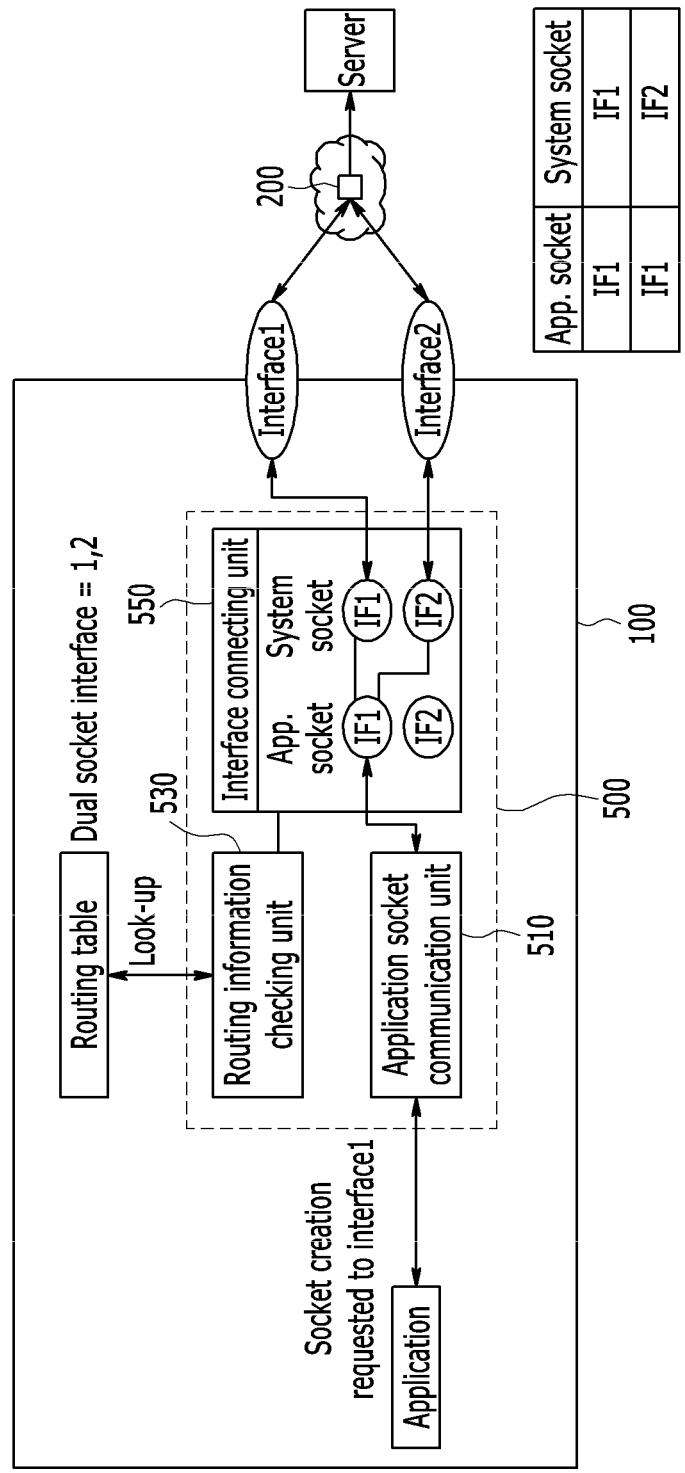
Figure 17:
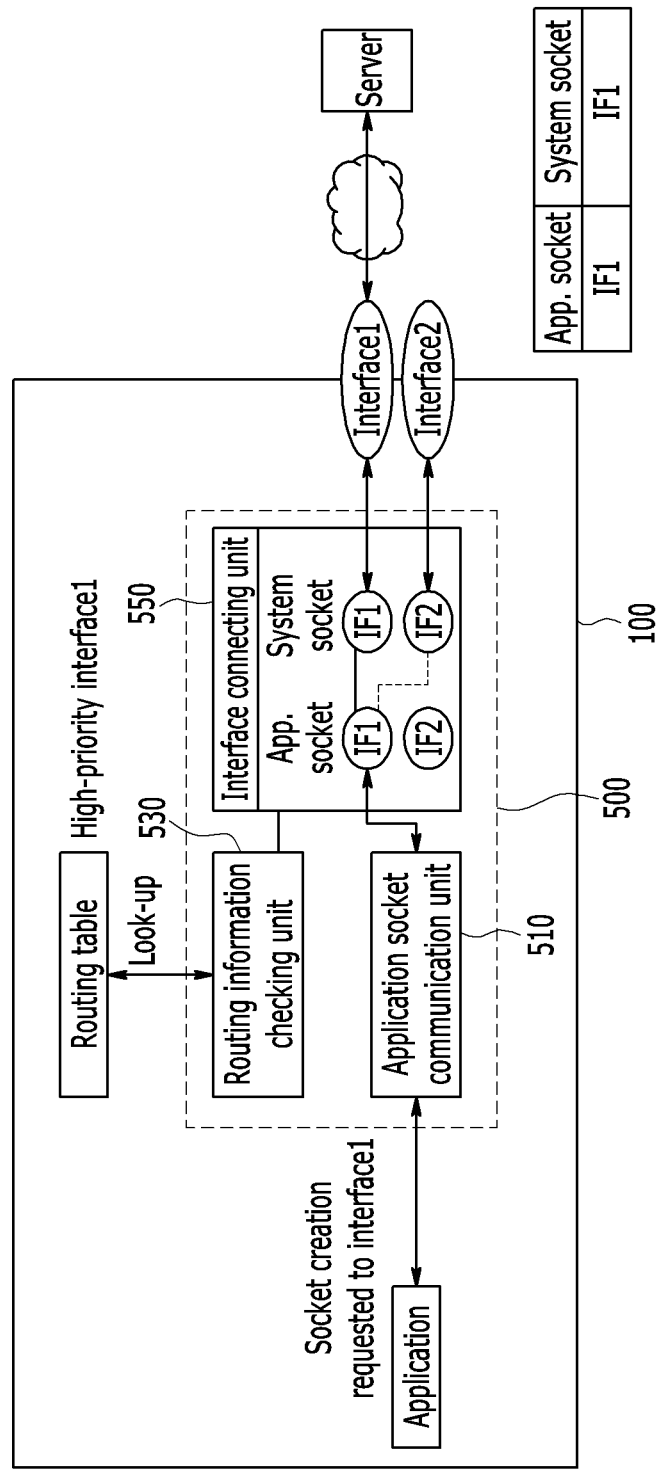

FIGS. 15 to 17 are functional block diagrams illustrating a socket communication method, according to an exemplary embodiment. In some exemplary embodiments, a terminal 100, having multiplex communication interfaces, can perform data communication using one communication network. The communication session can operate a socket communication structure of a network stack corresponding to a connection oriented service such as TCP. The communication session can also be extended to similar transport layer protocols as appreciated by those skilled in the art. When communication to a communication interface is no longer possible, a method of seamlessly and continuously using a communication session generated by an application is described with reference to FIGS. 15 to 17.

In some exemplary embodiments, a socket interworking manager 500 separates a socket viewed by the application of the terminal 100 (i.e. application socket) from a socket viewed by the network stack of the terminal 100 (i.e. system socket). While fixing a communication interface of the application socket to a specific communication interface (e.g., LTE), the socket interworking manager 500 connects to an access network via a communication interface, which is determined based on the system global routing table. In an exemplary embodiment, the socket interworking manager 500 establishes an IP address and supports global mobility by fixing the communication interface, such as LTE that is in an always-on state, to the communication interface of the socket that is bound to the application.

In some exemplary embodiments, the socket interworking manager 500 includes an application socket communication unit 510, a routing information checking unit 530, and an interface connecting unit 550. The socket interworking manager 500 may be included as software in a MPTCP manager 110/user-kernel interface unit 140, separately installed in the Android framework/Linux kernel, or developed as an application. The socket interworking manager 500 can be installed in various locations of the terminal 100. In the following description, the socket interworking manager 500 operates in the MPTCP manager 110.

In some exemplary embodiments, the application socket communication unit 510 is connected, as a socket created by a programming code of the application, to the application. The socket may be created by the general socket API (Application Programming Interface). The application socket communication unit 510 creates the socket using a designated communication interface of the multiple interfaces as the source address. For example, the session requested by the application may use the source address allocated to the LTE interface as an address for generating the socket. The session requested by the application may include the same source address as the communication interface set to a default gateway from the system global routing table. The session may also include a source address of another communication interface. In an exemplary embodiment, the application socket communication unit 510 can create the socket for all applications of the terminal via the LTE interface. The application socket communication unit 510 can generate the socket for a specific application (e.g., an application included in the whitelist) via the LTE interface.

In an exemplary embodiment, the routing information checking unit 530 checks routing information by accessing the routing table managed by the network stack included in the operating system of the terminal 100. The routing table may be the system global routing table managed by the user-kernel interface unit 140. The routing information checking unit 530 determines a source address using the routing table to create the session of the application requested by the application socket communication unit 510.

In an exemplary embodiment, the interface connecting unit 550 maps global routing information that is looked up by the routing information checking unit 530. The interface connecting unit 550 maps socket information created by the application socket communication unit 510. The interface connecting unit 550 connects the socket associated with the mapping information via the communication interface. The interface connecting unit 550 regenerates the socket such that communication is performed via the communication interface having a higher priority which is looked up by the routing information checking unit 530.

Referring to FIG. 15, in some exemplary embodiments, when an application is executed on the terminal 100, the application requests creation of the socket connected to the communication interface1 (e.g., LTE interface) fixed to the application socket communication unit 510.

In an exemplary embodiment, the interface connecting unit 550 looks up the routing table via the routing information checking unit 530. In some exemplary embodiments, when the communication interface2 (e.g., WiFi) is set to a higher interface in the routing table, the interface connecting unit 550 maps and stores the interface of the application socket as the interface1 and the interface of the system socket as the interface2 in the mapping table. The interface connecting unit 550 connects the interface1 viewed by the application socket to the interface2 viewed by the system socket based on the mapping table.

In an exemplary embodiment, the application creates the session via the communication interface1. The socket interworking manager 500 interconnects the communication interface1 of the application socket and the communication interface2 of the system socket such that traffic is transmitted via the communication interface2.

Referring to FIG. 16, the terminal 100 may be configured where aggregation transmission is possible via multiple paths, as in MPTCP. In some exemplary embodiments, the routing table can store dual socket interface information that enables connection to the communication interface1 and the communication interface2.

In an exemplary embodiment, when aggregation transmission is possible, the interface connecting unit 550 adds the interface1 to an interface of the system socket (i.e. the subflow via the communication interface1 is added). The interface connecting unit 550 looks up the routing table. The interface connecting unit 550 stores the interface of the application socket as the interface1 and stores the interface of the system socket as the interface1 and the interface2 in the mapping table.

In an exemplary embodiment, the application maintains the session connected via the communication interface1. The socket interworking manager 500 connects the communication interface1 of the application socket with the communication interface1 and the communication interface2 of the system socket, allowing the actual traffic to be transmitted via at least one of the communication interface1 or the communication interface2.

Referring to FIG. 17, a network connection can be dropped when the terminal moves to a location outside of the networks range. In some exemplary embodiments, in which a network connection is dropped, the routing table changes an interface having a higher priority to the communication interface1.

In an exemplary embodiment, the interface connecting unit 550 looks up the routing table, and updates the mapping table such that the interface of the application socket is the interface1 and that the interface of the system socket is the interface1.

In an exemplary embodiment, the application maintains the session connected via the communication interface1. The socket interworking manager 500 allows the actual traffic to be transmitted via the communication interface1 by connecting the communication interface1 of the application socket with the communication interface1 of the system socket. The communication session may be seamlessly maintained because the communication interface socket viewed by the application is maintained regardless of the actual connection interface.

In an exemplary embodiment, the socket interworking manager 500 identifies the respective communication interfaces of the application socket and the system socket. The socket interworking manager 500 connects the respective communication interfaces of the application socket and the system socket based on the mapping table. The interface, used in the communication, looks up the system global routing table, and the communication interface of the socket to be bound to the application is fixed as the communication interface, such as LTE which is in an always-on state.

In some exemplary embodiments, if the communication interface of the system socket, which is connected to the actual access network, is changed, the application can maintain the session via the socket which is created by the communication interface1 (e.g., LTE) that is always accessible. If the terminal 100 has difficulty using a WiFi network, once the socket interworking manager 500 switches LTE of the system socket, instead of WiFi of the system socket, to the LTE interface of the application socket, session information viewed by the application is maintained enabling the seamless session to be maintained between LTE and WiFi at the application level. The socket interworking manager 500 can address the problem of session being disconnected at the application level occurring when the access network is changed in the conventional method, reducing overhead for additional signaling such as tunneling.

Figure 18:
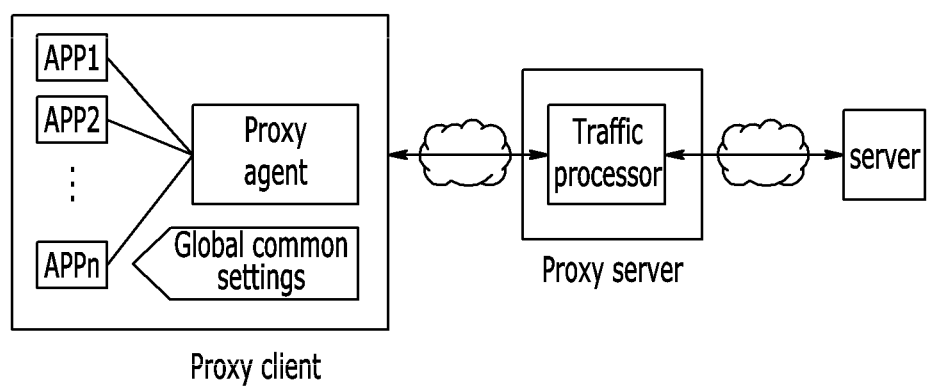
FIG. 18 is a functional block diagram illustrating a general proxy communication method.

FIG. 18 is a functional block diagram illustrating a general proxy communication method.

Typically, a router or a switch (i.e. an intermediate node) routes traffic generated from wired/wireless terminals based on source and destination addresses. The source and destination addresses can be header information of Internet Protocol (IP), which is Layer 3 of Open Systems Interconnection (OSI) 7 Layer. Traffic can be relayed via the intermediate node by artificially manipulating intermediate nodes or modifying configurations of the intermediate nodes. For example, when the mobile communication network traffic is transmitted out of a mobile communication network, settings or rules/policies of the gateway (e.g., P-GW, GGSN, etc.), which is mobile communication network device, are changed to forward the traffic to a specific router.

Typical proxy technology (e.g. SOCKS, HTTP, etc.) can route specific traffic to a specific node without the aid of the intermediate node. A proxy client delivers traffic to a proxy server which exists on a network, informing the proxy server of an original destination address. The proxy server delivers the traffic received from the terminal to the original destination address.

However, inherent in the proxy technology itself, a general proxy communication method generally has an issue delivering a large amount of traffic from mobile terminals connected to the mobile communication network to the proxy server.

A proxy application is limited to certain traffic (e.g., http protocol), and therefore, is limited to certain applications (e.g. a web browser application) that can be routed to the proxy server.

In addition, a proxy client used in a mobile terminal can transmit traffic to a proxy server based on information from the proxy server. However, this transmission is limited in that a manager managing the proxy server (e.g., a mobile network operator) has no means to dynamically distribute application information (whitelist) that requires proxy information and a proxy relay.

Figure 19:
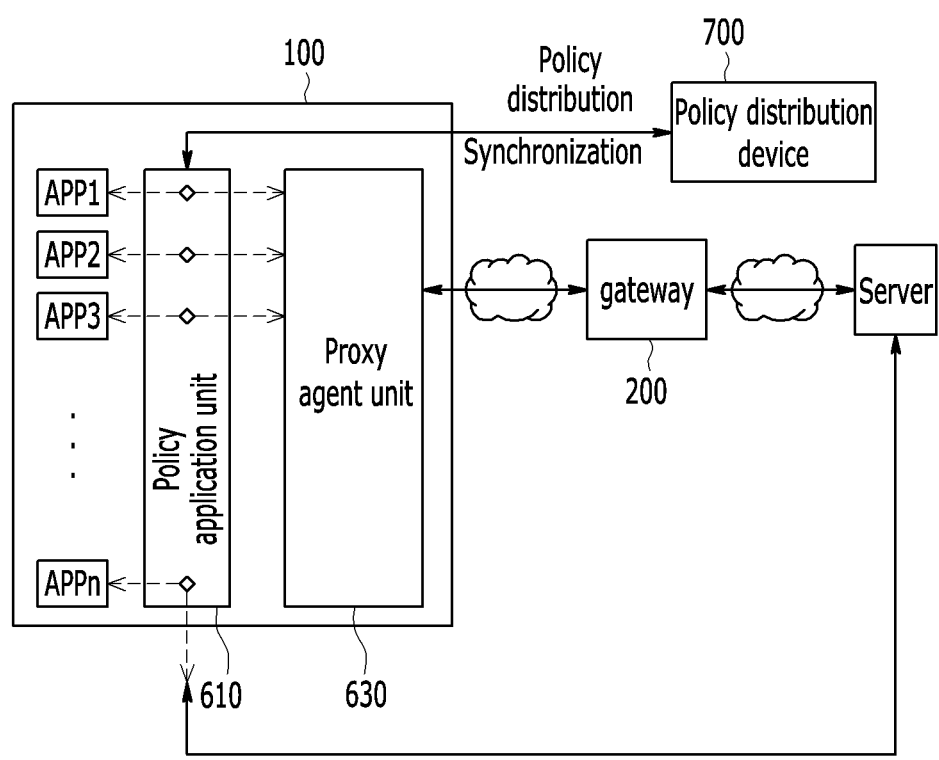
FIG. 19 is a functional block diagram illustrating a proxy communication method, according to an exemplary embodiment.

FIG. 19 is a functional block diagram illustrating a proxy communication method, according to an exemplary embodiment. In some exemplary embodiments, the terminal 100 and the gateway 200 operate as a proxy client and a proxy server, respectively. The terminal 100 includes a policy application unit 610 and a proxy agent unit 630. In an exemplary embodiment, functions of the policy application unit 610 and the proxy agent unit 630 may be implemented in the user-kernel interface unit 140 (FIG. 11). In another exemplary embodiment, the functions of the policy application unit 610 and the proxy agent unit 630 may be implemented in the MPTCP manager 110 or the MPTCP processor 130 (FIG. 11). In yet another exemplary embodiment, the functions of the policy application unit 610 and the proxy agent unit 630 may be installed in regions of the Android framework/Linux kernel or developed as an application.

In some exemplary embodiments, the policy distribution device 700 distributes a policy including proxy information to the terminal 100. The policy includes various information such as proxy server connection information, whitelist information, and an execution method. In an exemplary embodiment, the proxy server connection information and the whitelist information can be managed as one piece of data or separate pieces of data. In an exemplary embodiment, the policy, received by the terminal, may be applied differently depending on the type of information (i.e., subscription type of the terminal, connection path, various kinds of information for user convenience). The policy distribution device 700 synchronizes its policy information with the policy application unit 610. The policy distribution device 700 may distribute the policy using push/pull methods. In an exemplary embodiment, the policy distribution device 700 is implemented separately from the gateway 200. In another exemplary embodiment, the policy distribution device 700 is implemented in the gateway 200.

In some exemplary embodiments, the policy application unit 610 receives the policy distributed by the policy distribution device 700. The policy application unit 610 determines whether traffic is routed to the proxy server (i.e., gateway 200) or to the original destination server. In an exemplary embodiment, the policy application unit 610 delivers the policy to the gateway 200 via the proxy agent unit 630 of the applications included in the whitelist. The policy application unit 610 parses the policy information such that the policy information is processed to respond to a distributed structure of the gateway 200 (i.e. the proxy server). The policy application unit 610 parses the whitelist included in the policy information to control an operation of the proxy agent unit 630. In an exemplary embodiment, a communication function communicating with the policy distribution device 700 and a policy execution function may be separately implemented according to a design of the terminal. For example, the communication function and the policy execution function may be divided into an application region and an operating system kernel region.

In an exemplary embodiment, the proxy agent unit 630 transmits the traffic of the application determined by the policy application unit 610 for proxy communication to a predetermined proxy server. The proxy agent unit 630 performs proxy communication by connecting to an address of the gateway 200 that is included in the policy information.

Figure 20:
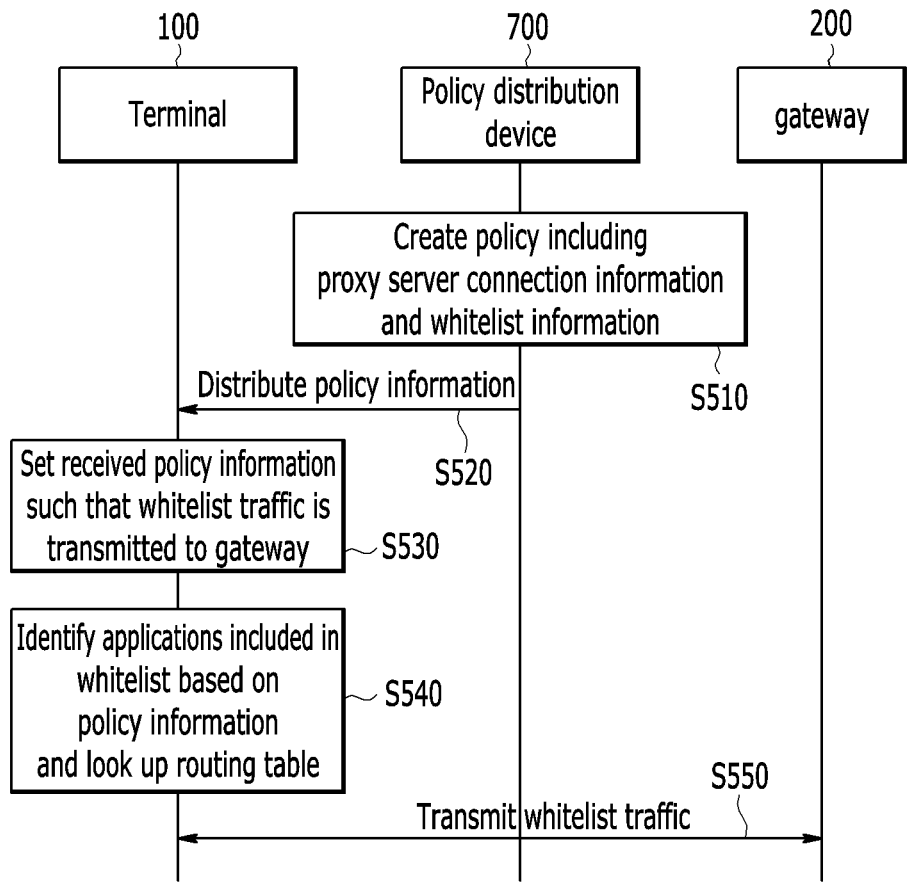
FIG. 20 is a flowchart illustrating operational steps of a proxy communication method, according to an exemplary embodiment.

FIG. 20 is a flowchart illustrating operational steps of a proxy communication method, according to an exemplary embodiment. The policy distribution device 700 creates a policy including proxy server connection information and whitelist information (S510).

In some exemplary embodiments, the proxy server connection information is dynamically provided information (i.e. one or more pieces of proxy server connection information including an IP address, a domain address, a port information, etc.). The proxy server connection information provides a bypass path at redundancy/load balancing/failover. The policy distribution device 700 may determine a connection path of the terminal by assigning a proxy priority. In an exemplary embodiment, the terminal 100 can connect to a low-priority proxy server via the proxy agent unit 630 when the terminal 100 cannot connect to a high-priority proxy server.

In some exemplary embodiments, the proxy server connection information is configured as follows:

Proxy server connection information={the number of accessible proxy servers (n), {proxy server URI.1, proxy server port information.1} . . . {proxy server URI.n, proxy server port information.n}}

In the proxy server connection information, URI may include an IP address or domain information.

In some exemplary embodiments, when the proxy server is split into three units such as 1.1.1.1:1111, 2.2.2.2:2222, and 3.3.3.3:3333, the proxy server connection information may be configured as follows:

Proxy server connection information={3, {1.1.1.1, 1111}, {2.2.2.2, 2222}, {3.3.3.3, 3333}}

In some exemplary embodiments, the whitelist information includes information about an application group which applies proxy communication. The whitelist information may be information about MPTCP-applicable applications that are relayed via the gateway 200 (i.e. the proxy server). The application information includes information such as a package name (e.g., package name of YouTube is com.google.youtube), which is unique information for each application, an application attribute group (e.g., web browser, media streaming), or other information known by those skilled in the art.

In an exemplary embodiment, an application in the terminal 100 can rely on another application registered in the system to create a communication session. For example, a file download via a web browser may rely on a download manager application, or execution of video/audio streaming contents may rely on a media player application. In an exemplary embodiment, the whitelist information can include information about the related applications as sub information when configuring the application information.

In some exemplary embodiments, the whitelist information may be made up as follows (a type is information that identifies an application package, an application attribute group, and inclusion of the sub information):

Whitelist information={the number of corresponding
groups(n),{type,package name/attribute}, . . .
{type,package name/attribute}}

For example, YouTube application may be identified as a "package+sub-application" type because it uses a media player application. In an exemplary embodiment, whitelist information containing two applications in which all attribute groups of a web browser type is applied as a whitelist is configured as follows:

Whitelist information={2,{package+sub-application,
com.google.youtube,media player},{attribute
group,web browser}}

The policy distribution device 700 distributes policy information to the terminal 100 (S520). In an exemplary embodiment, the terminal 100 updates the policy information when a specific event occurs. In another exemplary embodiment, the terminal 100 updates the policy information periodically when the terminal 100 receives the policy information from the policy distribution device 700.

The terminal 100 sets the received policy information such that whitelist traffic is delivered to the gateway 200 (S530). In an exemplary embodiment, the terminal 100 reconfigures a routing table of the traffic generated from the corresponding application based on the application package included in the whitelist information. A package name of a string type may be converted to an identifier in the terminal, e.g., to UID. A sub-application information may be converted to a UID or a system ID to obtain a globally unique value across all terminals. The application identifier may be used as a filter value when looking up the routing table. For example, the terminal 100 may determine whether or not a routing path via the gateway 200 (i.e. the proxy server) is applied based on the application identifier. In an exemplary embodiment, general applications, not included in the whitelist, can create a communication session based on system routing information according to the proxy communication method, and can perform data communication.

In an exemplary embodiment, the terminal 100 configures the routing table based on the policy information. For example, referring to Table 2, when an application having a package name of com.google.youtube is included in the whitelist, the terminal 100 changes the routing table such that the routing table reflects a connection address of the proxy server (e.g., 1.1.1.1/1111) instead of an original destination address/default proxy address (i.e. a default gateway address) of the application.

TABLE 2

| | |
|---|---|
| com.google.youtube | UID = 99999 |
| Before policy application: destination=*/* --> 192.168.0.1/* | |
| After policy application: destination=*/* && UID==99999 --> 1.1.1.1/1111 | |

When the application, included in the whitelist, generates traffic (i.e., the when corresponding application generates a communication session via input of a user or a programmed code (e.g., TCP handshaking)), the terminal 100 identifies the application included in the whitelist based on the policy information and looks up the routing table (S540).

The terminal 100 transmits whitelist traffic to the gateway 200 (S550). The terminal 100 obtains the connection address of the gateway 200 by looking up the routing table. And the terminal 100 communicates with the gateway 200 via the proxy agent unit 630. In an exemplary embodiment, the terminal 100 can attempt to connect to one or more gateways included in the policy information. In an exemplary embodiment, when a primary gateway is not accessible, the terminal 100 bypasses the primary gateway and connects to a low-priority gateway. The terminal 100 may secure a data path with the gateway 200 to transmit/receive the whitelist traffic depending on proxy methods (SOCKS, HTTP, etc.). A session created between the proxy agent unit 630 and the gateway 200 is maintained by proxy communication.

In an exemplary embodiment, when the policy distribution device 700 is used, as opposed to proxy communication via a conventional destination address or a specific application-based global configuration, a proxy communication structure is provided for each application. Accordingly, a network operator may bypass traffic to any gateway depending on the application's objective and use. An aggregation point (e.g. the gateway) of multipath transmission may be flexibly implemented via such proxy-based communication, allowing the network operator to control and manage transmission aggregation for each application.

Figure 21:
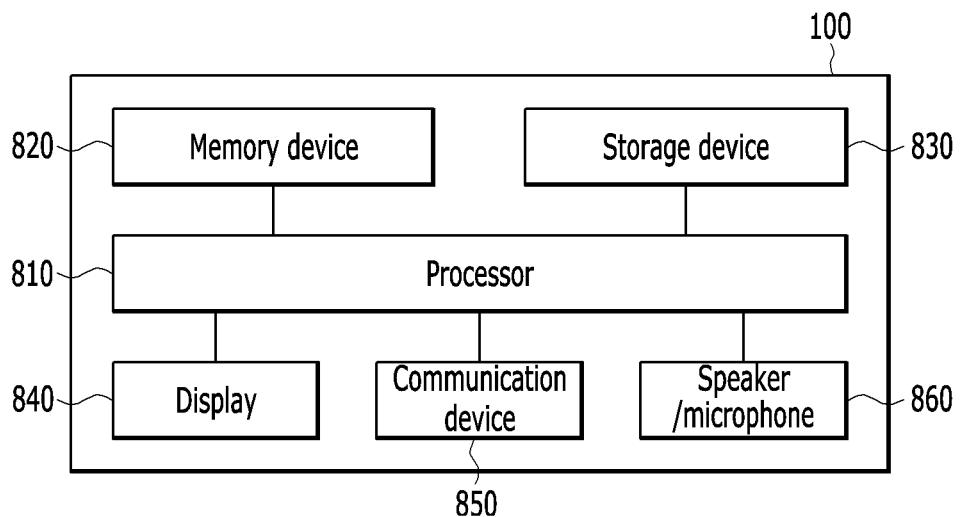
FIG. 21 is a hardware block diagram depicting components of a terminal, according to an exemplary embodiment.

FIG. 21 is a hardware block diagram depicting components of a terminal, according to an exemplary embodiment In some exemplary embodiments, the hardware of the terminal 100 includes a processor 810, a memory device 820, a storage device 830, a display 840, a communication device 850, and a speaker/microphone 860, and a program combined with hardware is stored at a designated location. The hardware has a configuration and performance capable of executing the method described according to exemplary embodiments. The operation method described with reference to FIGS. 1 to 20 is written as software program in a program language. The program is combined with hardware, such as the processor 810 and the memory device 820, to execute the present invention. In an exemplary embodiment, the program can be stored at a designated location.

In some exemplary embodiments, the hardware of the network device, including the gateway 200 and the policy distribution device 700, includes a processor, a memory device, a storage device, and a communication device, and a program combined with hardware is stored at a designated location. The hardware has a configuration and performance capable of executing the method described according to exemplary embodiments above. The operation method described with reference to FIGS. 1 to 20 is written as software program in a program language. The program is combined with hardware, such as the processor and the memory device, to execute the present invention.

According to the exemplary embodiment a plurality of available wireless networks can be simultaneously used to process data transmitted to each path in one session. According to the exemplary embodiment, the terminal can be connected to the plurality of access networks. One or more services or applications may aggregate a plurality of networks into one network. According to the exemplary embodiment, a large amount of data may be transmitted/received using a plurality of available network resources. According to the exemplary embodiment, the terminal can perform multipath TCP-based data communication with general servers that do not support multipath transmission.

The foregoing exemplary embodiments may also be implemented by programs realizing functions corresponding to the configuration of the exemplary embodiment or by recording media which can record the programs.

This invention has been described in connection with exemplary embodiments. However, the invention is not limited to the disclosed embodiments, and, can include various modifications and equivalent arrangements within the spirit and scope of the appended claims.

The invention claimed is:

1. A method for multipath communication of a terminal via a gateway, the method comprising:
    storing a whitelist including applications corresponding to multipath communication applicable objects, and
    generating, when a first application included in the whitelist is executed, at least one path connected to the gateway using at least one of multiplex communication interfaces, and
    sending, when a second application not included in the whitelist is executed, traffic of the second application via a path that does not include the gateway.

2. The method of claim 1, further comprising:
    determining, when the first application is executed, whether the first application is included in the whitelist or not based on an identifier of the first application.

3. The method of claim 1, wherein the generating of the at least one path connected to the gateway further includes generating subflows connected to the gateway via each of a plurality of networks, and delivering traffic of the first application using the subflows of the networks to which connections are maintained.

4. The method of claim 1, wherein the storing of the whitelist includes receiving at least one application list from a network device, and storing the received application list in the whitelist.

5. The method of claim 1, further comprising:
    configuring a routing table such that traffic generated from the applications included in the whitelist is relayed via the gateway.

6. The method of claim 1, wherein the generating of the at least one path connected to the gateway includes:
    configuring a source address used to create a socket of the first application as a first communication interface;
    mapping information about a first socket created by the first application using the first communication interface as a source address and information about a second socket created using at least one communication interface set in a routing table as a source address, and storing the mapping information in a mapping table; and
    sending/receiving traffic of the first application via the at least one communication interface set in the routing table based on the mapping table.

7. The method of claim 6, wherein the generating of the at least one path connected to the gateway further includes updating, when the communication interface used by the second socket as the source address is changed, the mapping table based on information about the changed interface.

8. The method of claim 6, wherein the first communication interface is an interface for connection with a mobile communication network.

9. A method for multipath communication of a gateway which communicates with a terminal, comprising:
generating a first session with the terminal via a first network to deliver traffic of the application that is executed on the terminal;
generating a second session with the terminal via a second network to deliver the traffic of the application; and
delivering the traffic of the application via the first and second sessions,
wherein the delivering traffic of the application includes
determining a type of the first network based on information about the first session, and
throttling, when the first network is a predetermined preferred network, delivery of the traffic via the second session.

10. The method of claim 9, wherein the predetermined preferred network is a WiFi network.

11. The method of claim 9, wherein the delivering of the application traffic includes
monitoring a communication state of the first network, and
unthrottling, when the first network provides quality below a reference level as a result of monitoring, the delivery of the traffic via the second session.

12. The method of claim 9, wherein in the delivering of the application traffic, the delivery of traffic is controlled via the first and second sessions based on a payment plan of the terminal.

13. A method of operating a policy distribution device and a terminal for multipath communication, comprising:
generating, by the policy distribution device, a proxy policy including proxy server connection information and whitelist information, the whitelist information including a list of applications that correspond to multipath communication applicable objects;
distributing, by the policy distribution device, the proxy policy to the terminal;
transmitting, by the terminal, traffic of applications included in the whitelist to a predetermined proxy server based on the proxy policy; and
transmitting, by the terminal, traffic of applications not included in the whitelist to a server other than the predetermined proxy server.

14. The method of claim 13, wherein the transmitting to the predetermined proxy server includes:
configuring, by the terminal, a routing table such that traffic of a first application included in the whitelist is relayed via the predetermined proxy server, and applying the proxy policy;
identifying the first application based on identification information of the executed application; and
transmitting the traffic of the first application to the predetermined proxy server by looking up the routing table associated with the first application.

15. The method of claim 13, wherein in the transmitting to the predetermined proxy server, the traffic of the first application is sent via multiple paths that are connected to the predetermined proxy server.

* * * * *